United States Patent
Sandou et al.

(10) Patent No.: US 10,352,216 B2
(45) Date of Patent: Jul. 16, 2019

(54) ENGINE DEVICE

(71) Applicant: YANMAR CO., LTD., Osaka-shi, Osaka (JP)

(72) Inventors: Yoshiyuki Sandou, Osaka (JP); Tomoyuki Kimura, Osaka (JP)

(73) Assignee: YANMAR CO., LTD., Osaka (JP)

( * ) Notice: Subject to any disclaimer, the term of this patent is extended or adjusted under 35 U.S.C. 154(b) by 65 days.

(21) Appl. No.: 15/270,215

(22) Filed: Sep. 20, 2016

(65) Prior Publication Data

US 2017/0009627 A1 Jan. 12, 2017

Related U.S. Application Data

(63) Continuation of application No. PCT/JP2015/056657, filed on Mar. 6, 2015.

(30) Foreign Application Priority Data

| Mar. 20, 2014 | (JP) | 2014-059113 |
| Mar. 20, 2014 | (JP) | 2014-059114 |
| Mar. 27, 2014 | (JP) | 2014-065695 |

(51) Int. Cl.
*E02F 9/08* (2006.01)
*F01N 3/10* (2006.01)
(Continued)

(52) U.S. Cl.
CPC ....... *F01N 3/2066* (2013.01); *B01D 53/9477* (2013.01); *E02F 9/0866* (2013.01);
(Continued)

(58) Field of Classification Search
CPC .......... B01D 2258/012; B01D 53/9418; B01D 53/9477; F01N 13/009; F01N 13/0097;
(Continued)

(56) References Cited

U.S. PATENT DOCUMENTS

| 6,863,154 B2 * | 3/2005 | Uegane | F01N 13/08 |
| | | | 181/207 |
| 8,715,578 B2 * | 5/2014 | Fukuda | F01N 3/035 |
| | | | 422/170 |

(Continued)

FOREIGN PATENT DOCUMENTS

| CN | 1390717 A | 1/2003 |
| EP | 2535537 A1 | 12/2012 |

(Continued)

OTHER PUBLICATIONS

Chinese Office Action dated Apr. 23 2018 issued in corresponding Chinese Application No. 201580008095.4.

(Continued)

*Primary Examiner* — Audrey K Bradley
*Assistant Examiner* — Anthony Ayala Delgado
(74) *Attorney, Agent, or Firm* — Norton Rose Fulbright US LLP

(57) ABSTRACT

An engine device is provided with a first case which removes particulate matters in exhaust gas of an engine, and a second case which removes nitrogen oxides in the exhaust gas of the engine. The second case is connected to the first case via a urea mixing pipe. An exhaust gas inlet surface of the first case is joined to an exhaust gas outlet surface of the engine, and a support base firmly fixed to the engine is provided. The support base is partly brought into surface contact with the exhaust gas outlet surface of the engine.

13 Claims, 27 Drawing Sheets

(51) Int. Cl.
*F01N 3/20* (2006.01)
*F01N 3/28* (2006.01)
*B01D 53/94* (2006.01)
*F01N 13/00* (2010.01)
*F01N 13/18* (2010.01)
*F01N 3/021* (2006.01)

(52) U.S. Cl.
CPC ............ *F01N 3/021* (2013.01); *F01N 3/106* (2013.01); *F01N 3/2853* (2013.01); *F01N 13/009* (2014.06); *F01N 13/0097* (2014.06); *F01N 13/1805* (2013.01); *F01N 13/1822* (2013.01); *F01N 13/1827* (2013.01); *F01N 13/1855* (2013.01); *B01D 53/9418* (2013.01); *B01D 2251/2067* (2013.01); *B01D 2257/404* (2013.01); *B01D 2258/012* (2013.01); *F01N 2590/08* (2013.01); *F01N 2610/02* (2013.01); *Y02T 10/24* (2013.01)

(58) Field of Classification Search
CPC ............ F01N 13/1805; F01N 13/1822; F01N 13/1827; F01N 13/1855; F01N 2590/08; F01N 3/021; F01N 3/2853
See application file for complete search history.

(56) References Cited

U.S. PATENT DOCUMENTS

| | | | | |
|---|---|---|---|---|
| 8,887,493 | B2* | 11/2014 | Shin | F01N 13/00 180/309 |
| 9,416,707 | B2* | 8/2016 | Tanaka | F01N 3/035 |
| 2010/0031644 | A1 | 2/2010 | Keane et al. | |
| 2010/0186394 | A1* | 7/2010 | Harrison | F01N 3/103 60/299 |
| 2010/0196219 | A1 | 8/2010 | Endo et al. | |
| 2012/0273648 | A1* | 11/2012 | Maske | B60K 13/04 248/636 |
| 2012/0305112 | A1* | 12/2012 | Mitsuda | F01N 13/00 137/560 |
| 2013/0298551 | A1* | 11/2013 | Shin | F01N 13/00 60/605.1 |
| 2013/0343853 | A1 | 12/2013 | Sato et al. | |
| 2016/0076430 | A1* | 3/2016 | Freeman | F01N 3/2066 60/301 |

FOREIGN PATENT DOCUMENTS

| | | |
|---|---|---|
| JP | 2009-074420 A | 4/2009 |
| JP | 2012-021505 A | 2/2012 |
| JP | 2012-062809 A | 3/2012 |
| JP | 2012-072722 A | 4/2012 |
| JP | 2012-136845 A | 7/2012 |
| JP | 2012-177233 A | 9/2012 |
| JP | 2012-215022 A | 11/2012 |
| JP | 2013-104394 A | 5/2013 |
| JP | 2013-189894 A | 9/2013 |

OTHER PUBLICATIONS

European Search Report dated Nov. 27, 2017 issued in corresponding European Application No. 15765853.5.

\* cited by examiner

ENGINE DEVICE

CROSS-REFERENCE TO RELATED APPLICATIONS

The present application is a continuation application of International Application No. PCT/JP2015/56657, filed Mar. 6, 2015, which claims priority to Japanese Patent Application No. 2014-59113, filed Mar. 20, 2014, Japanese Patent Application No. 2014-59114, filed Mar. 20, 2014, and Japanese Patent Application No. 2014-65695, filed Mar. 27, 2014. The contents of these applications are incorporated herein by reference in their entirety.

BACKGROUND OF THE INVENTION

The present invention relates to an engine device.

In a working vehicle such as the tractor or the wheel loader, an opening and closing fulcrum shaft was arranged in a rear portion of a hood for covering an engine and the hood was rotated around the opening and closing fulcrum shaft, for streamlining a maintenance work of the engine which was arranged in a front portion of a travel machine body. Further, there has been conventionally known a technique of purifying the exhaust gas discharged from the diesel engine by arranging a case inwardly provided with a diesel particulate filter (hereinafter, refer to as a DPF case) and a case inwardly provided with a urea selective reducing type catalyst (hereinafter, refer to as an SCR case) as an exhaust gas purification device (an exhaust gas aftertreatment device) in an exhaust channel of the diesel engine, and introducing the exhaust gas to the DPF case and the SCR case (for example, refer to Japanese Unexamined Patent Publication No. 2009-74420, Japanese Unexamined Patent Publication No. 2012-21505, Japanese Unexamined Patent Publication No. 2013-104394, and Japanese Unexamined Patent Publication No. 2012-177233).

SUMMARY OF THE INVENTION

In the case that the DPF case and the SCR case are assembled away from the engine, the temperature of the exhaust gas supplied from the engine to the DPF case or the SCR case has been conventionally lowered, and a chemical reaction such as regeneration of a diesel particulate filter or a selective catalyst reducing action has tended to be incomplete. Accordingly, there has been conventionally a problem that, for example, a special device for keeping the temperature of the exhaust gas in the SCR case at a high temperature is necessary. Further, there is a technique of attaching the DPF case and the SCR case by attaching the DPF case and the SCR case to two parallel base frames, and fastening these two base frames to a subject to be installed, such as Japanese Unexamined Patent Publication No. 2013-104394. However, it is necessary to form an attaching surface of the subject to be installed into a horizontal shape (a flat shape), and there is a problem that, for example, a support attitude of the DPF case and the SCR case is hard to be set to a predetermined attitude due to a working error of the attachment part such as the base frame. On the other hand, in the case that the DPF case and the SCR case are assembled close to the engine, it is necessary to secure an installation space for the SCR case in a lateral side of the engine. As a result, there is a problem that, for example, the DPF case and the SCR case can not be supported compactly as well as an engine room is hard to be constructed compactly.

Further, in the case that the exhaust gas of the engine is introduced to the DPF case by connecting an exhaust gas inlet of the DPF case to an exhaust gas outlet of the engine, a gasket for preventing gas leakage is necessarily interposed between a surface of the exhaust gas outlet of the engine and a surface of the exhaust gas inlet of the DPF case. However, an assembly regulating work tends to be complicated in relation to an assembly dimension error, and there is a problem that, for example, an assembly workability or a maintenance workability of the DPF case and the like can not be improved.

Consequently, the invention aims at providing an engine device to which an improvement is applied by making a study of these actual conditions.

The invention according to a first aspect of the present invention is an engine device including a first case which removes particulate matters in exhaust gas of an engine, a second case which removes nitrogen oxides in the exhaust gas of the engine, and the second case being connected to the first case via a urea mixing pipe, wherein an exhaust gas inlet surface of the first case is joined to an exhaust gas outlet surface of the engine, a support base firmly fixed to the engine is provided, and the support base is partly brought into surface contact with the exhaust gas outlet surface of the engine.

The invention according to a second aspect of the present invention is the engine device according to the first aspect, wherein the support base may be directly brought into surface contact with the exhaust gas outlet surface of the engine, and a gasket may be pinched between the exhaust gas outlet surface of the engine and the exhaust gas inlet surface of the first case.

The invention according to a third aspect of the present invention is the engine device according to the first aspect, wherein a gasket may be pinched between the exhaust gas outlet surface of the engine and the exhaust gas inlet surface of the first case, and the gasket may be extended between the exhaust gas outlet surface of the engine and the surface contact portion of the support base.

The invention according to a fourth aspect of the present invention is the engine device according to the first aspect, wherein the engine device may further include a support frame body which firmly fixes the first case and the second case, the first case and the second case may be firmly and integrally fixed to the support frame body by a plurality of pinching bodies, and the pinching body in the first case side and the pinching body in the second case side may be offset in a longitudinal direction of each of the cases.

The invention according to a fifth aspect of the present invention is the engine device according to the fourth aspect, wherein the engine device may further include a plurality of case fixing bodies which firmly and integrally fix the first case or the second case by the plurality of pinching bodies, the first case and the second case may be firmly and integrally fixed by the plurality of pinching bodies and the plurality of case fixing bodies, the support base firmly fixed to an upper surface side of the engine may be provided, and the plurality of case fixing bodies may be coupled to the upper surface side of the support base via the support frame body.

The invention according to a sixth aspect of the present invention is the engine device according to the fifth aspect, wherein the plurality of case fixing bodies may be coupled to the support frame body so as to be adjustable in their relative positions, an exhaust gas purification unit may be formed by firmly and integrally fixing each of the cases to the support frame body via the plurality of case fixing bodies, and the exhaust gas purification unit may be mounted on and fixed to the support base.

The invention according to a seventh aspect of the present invention is the engine device according to the sixth aspect, wherein the exhaust gas purification unit may be formed by firmly and integrally fixing the first case and the second case by the support frame body, and the engine and the exhaust gas purification unit may be supported in a transportable manner in a state of being separated.

The invention described in an eighth aspect of the present invention is the engine device according to the seventh aspect, wherein the engine device may further include the support base which detachably fastens the support frame body by bolts, the support base may be firmly fixed as a part of the engine to an outer peripheral side of the engine during an assembling step of the engine, and the exhaust gas purification unit may be attached to and detached from the engine via the support base.

The invention described in a ninth aspect of the present invention is the engine device according to the sixth aspect, wherein the engine, the exhaust gas purification unit, and assembly accessories for one set may be mounted to the same packing base, and the packing base may be loadable to a transport container.

According to the embodiment of the invention of the first aspect, in the engine device including the first case which removes the particulate matters in the exhaust gas of the engine, the second case which removes the nitrogen oxides in the exhaust gas of the engine, and the second case being connected to the first case via the urea mixing pipe, the exhaust gas inlet surface of the first case is joined to the exhaust gas outlet surface of the engine, the support base firmly fixed to the engine is provided, and the support base is partly brought into surface contact with the exhaust gas outlet surface of the engine. As a result, the support base can be constructed as a sheet metal structure with high rigidity and an attachment strength can be easily secured, while an attachment position of the support base can be simply determined by coupling the exhaust gas outlet surface of the engine and the support base. For example, it is possible to improve an assembly workability of the support base in a state in which an attachment attitude of the support base is horizontal to the engine.

According to the embodiment of the invention of the second aspect, the support base is directly brought into surface contact with the exhaust gas outlet surface of the engine, and the gasket is pinched between the exhaust gas outlet surface of the engine and the exhaust gas inlet surface of the first case. As a result, the attachment attitude of the support base can be determined on the basis of the surface contact between the exhaust gas outlet surface of the engine and the support base, it is possible to improve the attachment workability of the support base to the engine, and it is possible to form the gasket with a small area.

According to the embodiment of the invention of the third aspect, the gasket is pinched between the exhaust gas outlet surface of the engine and the exhaust gas inlet surface of the first case, and the gasket is extended between the exhaust gas outlet surface of the engine and the surface contact portion of the support base. As a result, the first case can be firmly fixed to the support base by regulating the support position of the first case so that the surface contact portions between the exhaust gas inlet surface of the first case and the support base are flush. It is possible to form the height position of the exhaust gas inlet surface of the first case and the height position of the first case attachment surface of the support base flush without necessity of taking the thickness of the gasket into consideration, and it is possible to easily determine the relative positions of the support base and the first case (the exhaust gas purification device) on the basis of the same plane.

According to the embodiment of the invention of the fourth aspect, the support frame body firmly fixing the first case and the second case is further provided, the first case and the second case are firmly and integrally fixed to the support frame body by a plurality of pinching bodies, and the pinching body in the first case side and the pinching body in the second case side are offset in the longitudinal direction of each of the cases. As a result, it is not necessary to secure an installation space for both of the pinching body in the first case side and the pinching body in the second case side between the first case and the second case, it is possible to reduce the installation width dimension of each of the pinching bodies on the basis of the offset arrangement, it is possible to easily reduce the attachment interval for the first case and the second case, for example, which are long in the exhaust gas moving direction and are formed into the cylindrical shapes, and it is possible to compactly arrange the first case and the second case within the width dimension of the case attachment portion of the engine. Further, it is possible to inhibit the exhaust gas temperature in the inner portion of each of the cases from being lowered due to the close contact arrangement of the first case and the second case, and it is possible to well maintain the exhaust gas purification action of each of the cases.

According to the embodiment of the invention of the fifth aspect, a plurality of case fixing bodies firmly and integrally fixing the first case or the second case by the plurality of pinching bodies are provided, the first case and the second case are firmly and integrally fixed by the plurality of pinching bodies and the plurality of case fixing bodies, the support base firmly fixed to the upper surface side of the engine is provided, and the plurality of case fixing bodies are coupled to the upper surface side of the support base via the support frame body. As a result, each of the cases can be easily assembled in or disassembled from the upper surface side of the engine by attaching or detaching the support frame body and the support base, while the first case and the second case can be compactly arranged within the width dimension of the upper surface side of the engine.

According to the embodiment of the invention of the sixth aspect, the plurality of case fixing bodies are coupled to the support frame body so as to be adjustable in their relative positions, the exhaust gas purification unit is formed by firmly and integrally fixing each of the cases to the support frame body via the plurality of case fixing bodies, and the exhaust gas purification unit is mounted on and fixed to the support base. As a result, it is possible to simplify the relatively positioning work for the support base and the first case on the basis of the attachment position in the engine side, and the exhaust gas purification unit can be simply assembled in or disassembled from the engine on the basis of the attaching and detaching work of the support base and the support frame body.

According to the embodiment of the invention of the seventh aspect, the exhaust gas purification unit is formed by firmly and integrally fixing the first case and the second case by the support frame body, and the engine and the exhaust gas purification unit are supported in the transportable manner in the state of being separated. As a result, the exhaust gas purification unit can be simply combined with the engine on the basis of a bolt fastening work when mounting to the working vehicle or the like. The exhaust gas purification unit can be easily assembled in the engine at the place where the engine is mounted, and it is possible to reduce an assembling man-hour (an assembling cost) in the assembling plant for the working vehicle or the like, while the engines and the exhaust gas purification units can be packed with a low level, and a transporting cost can be reduced by improving a mounting property to the transport container.

According to the embodiment of the invention of the eighth aspect, the support base detachably fastening the support frame body by bolts is provided, the support base is firmly fixed as a part of the engine to the outer peripheral side of the engine during the assembling step of the engine, and the exhaust gas purification unit is attached to and detached from the engine via the support base. As a result, the exhaust gas purification unit can be supported to the engine with an appropriate attitude, on the basis of a simple assembling work of coupling the support frame body to the support base. In the assembling plant for the working vehicle or the like to which the engine is mounted, it is possible to reduce the assembling man-hour for the exhaust gas purification unit, and it is possible to improve the assembly workability of the engine and the exhaust gas purification unit by reducing an assembly error of the exhaust gas purification unit.

According to the embodiment of the invention of the ninth aspect, the engine, the exhaust gas purification unit, and assembly accessories for one set are mounted to the same packing base, and the packing base is loadable to the transport container. As a result, it is possible to pack with a low level in the full height of the engine, it is possible to improve a mounting property of the transport container, and it is possible to reduce a transport cost, while the engine, the exhaust gas purification unit, and the assembly accessories can be transported collectively as one set of the assembly materials.

DESCRIPTION OF THE EMBODIMENTS

Figure 1:
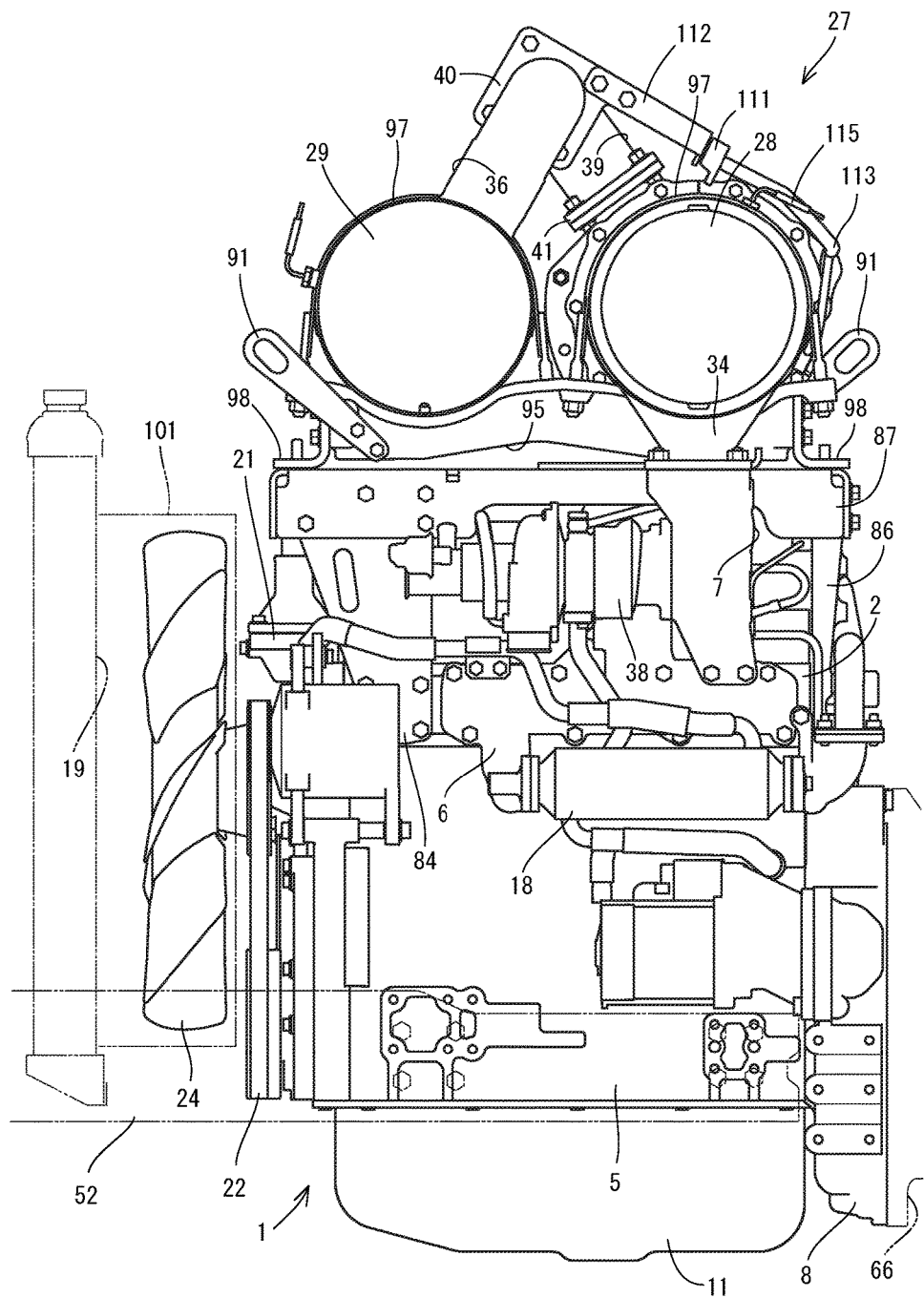
FIG. 1 is a left side elevational view of a diesel engine and shows a first embodiment.
Figure 2:
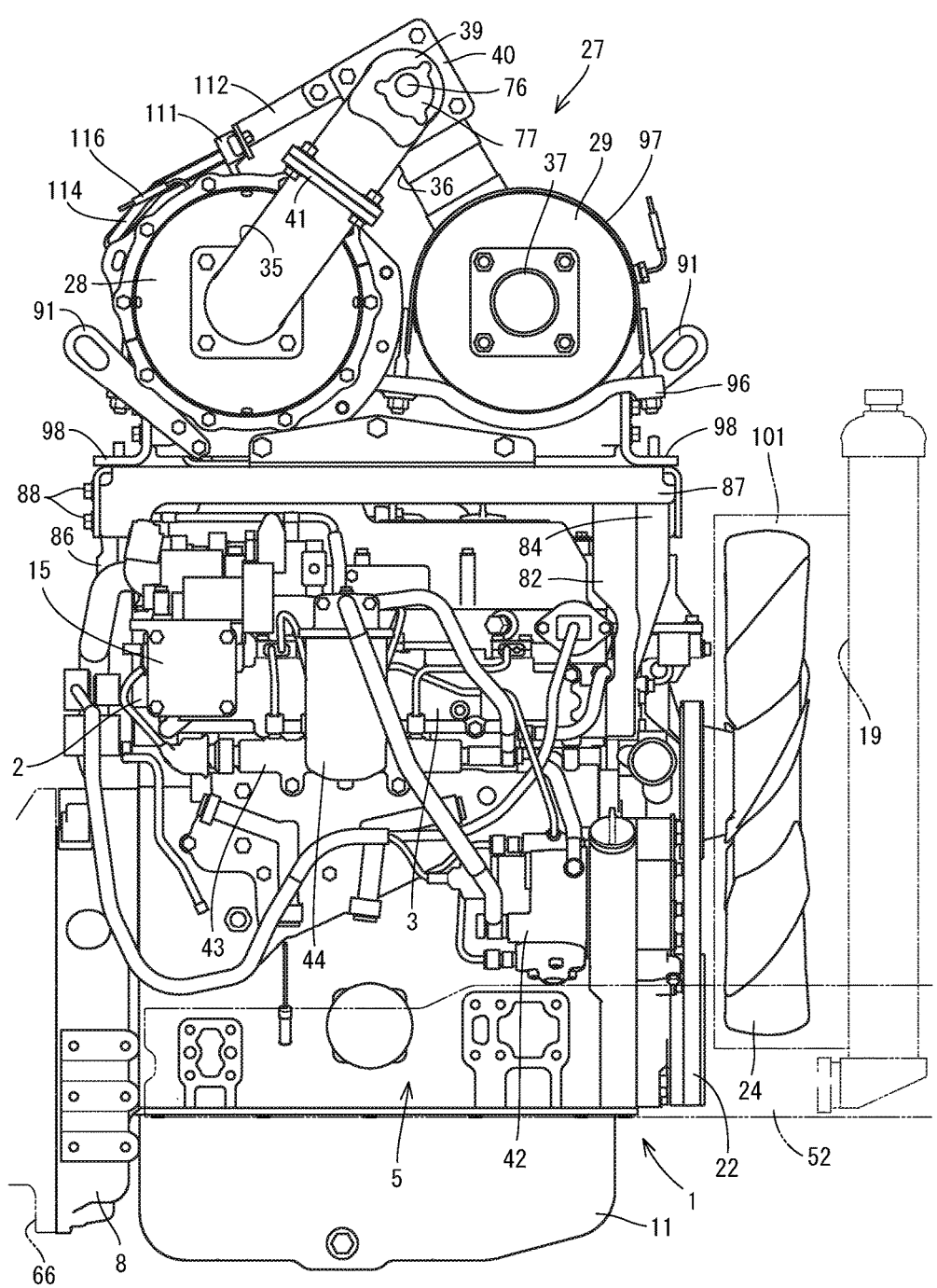
FIG. 2 is a right side elevational view of the same.
Figure 3:
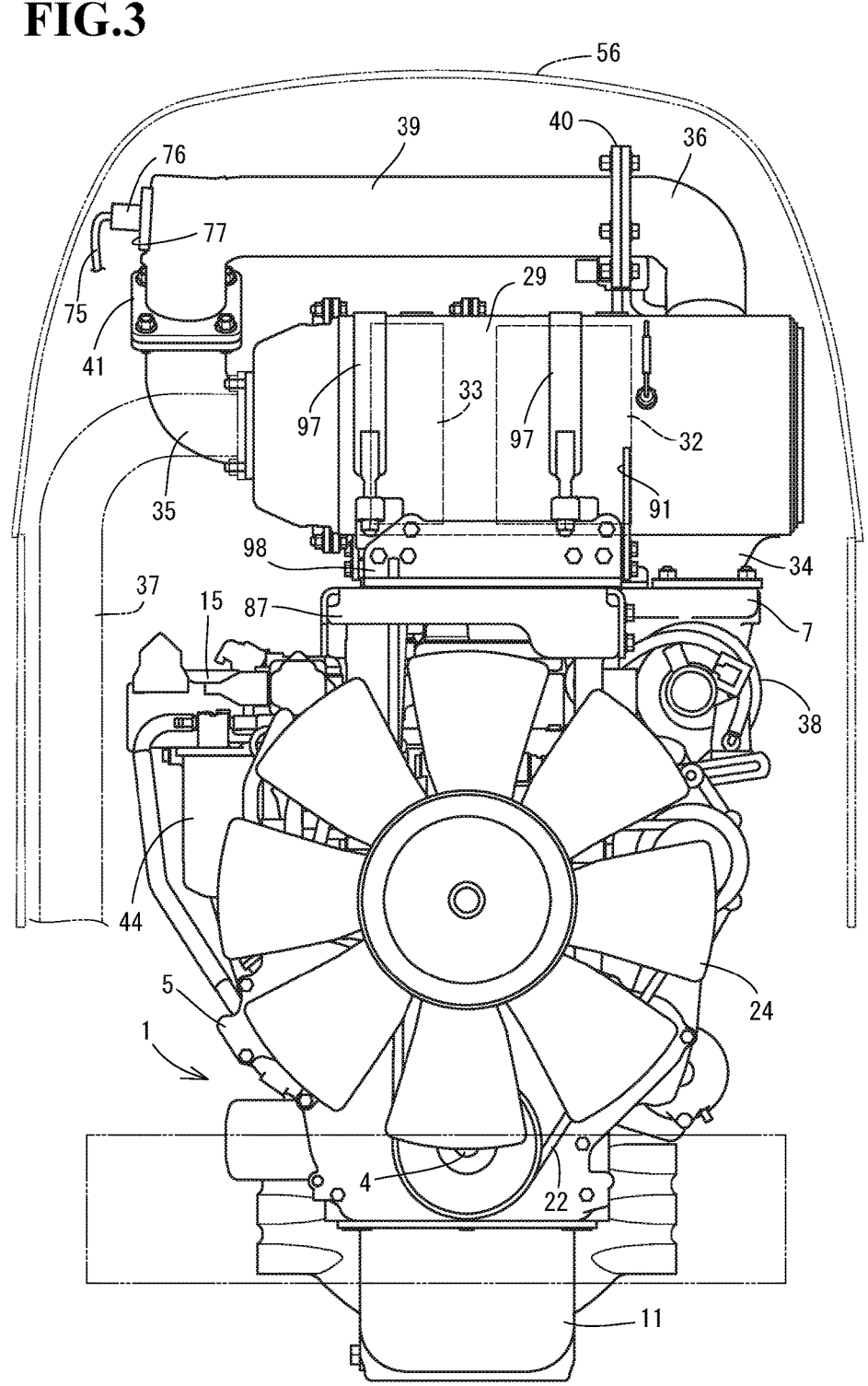
FIG. 3 is a front elevational view of the same.

A description will be given below of a first embodiment obtained by embodying the present invention with reference to the accompanying drawings (FIGS. 1 to 12). FIG. 1 is a left side elevational view of a diesel engine 1 in which an exhaust manifold 6 is installed, FIG. 2 is a right side elevational view of the diesel engine 1 in which an intake manifold 3 is installed, and FIG. 3 is a front elevational view of the diesel engine 1 in which a cooling fan 24 is installed. A side in which the exhaust manifold 6 is installed is called as a left side surface of the diesel engine 1, a side in which the intake manifold 3 is installed is called as a right side surface of the diesel engine 1, and a side in which the cooling fan 24 is installed is called as a front surface of the diesel engine 1. A description will be given of an overall structure of the diesel engine 1 with reference to FIGS. 1 to 8.

As shown in FIGS. 1 to 7, an intake manifold 3 is arranged in one side surface of a cylinder head 2 of a diesel engine 1. The cylinder head 2 is mounted on a cylinder block 5 which has an engine output shaft 4 (a crank shaft) and a piston (not shown) built-in. An exhaust manifold 6 is arranged in the other side surface of the cylinder head 2. A front end and a rear end of the engine output shaft 4 are protruded out of a front surface and a back surface of the cylinder block 5.

As shown in FIGS. 1 to 7, a flywheel housing 8 is firmly fixed to the back surface of the cylinder block 5. A flywheel 9 is provided within the flywheel housing 8. The flywheel 9 is axially supported to the rear end side of the engine output shaft 4. Power of the diesel engine 1 is adapted to be taken out via the flywheel 9. Further, a sump 11 is arranged in a lower surface of the cylinder block 5.

As shown in FIGS. 2 to 5 and FIG. 7, an exhaust gas recirculation device (EGR) 15 taking into exhaust gas for recirculation is arranged in the intake manifold 3. An air cleaner 16 (refer to FIG. 13) is connected to the intake manifold 3. External air which is dust removed and purified by the air cleaner 16 is adapted to be fed to the intake manifold 3, and be supplied to each of cylinders of the diesel engine 1.

According to the above structure, the exhaust gas discharged out of the diesel engine 1 to the exhaust manifold 6 is partly reflowed to each of the cylinders of the diesel engine 1 from the intake manifold 3 via the exhaust gas recirculation device 15. As a result, a combustion temperature of the diesel engine 1 is lowered, a discharge amount of nitrogen oxides (NOx) from the diesel engine 1 is lowered, and a fuel consumption of the diesel engine 1 is improved.

Figure 13:
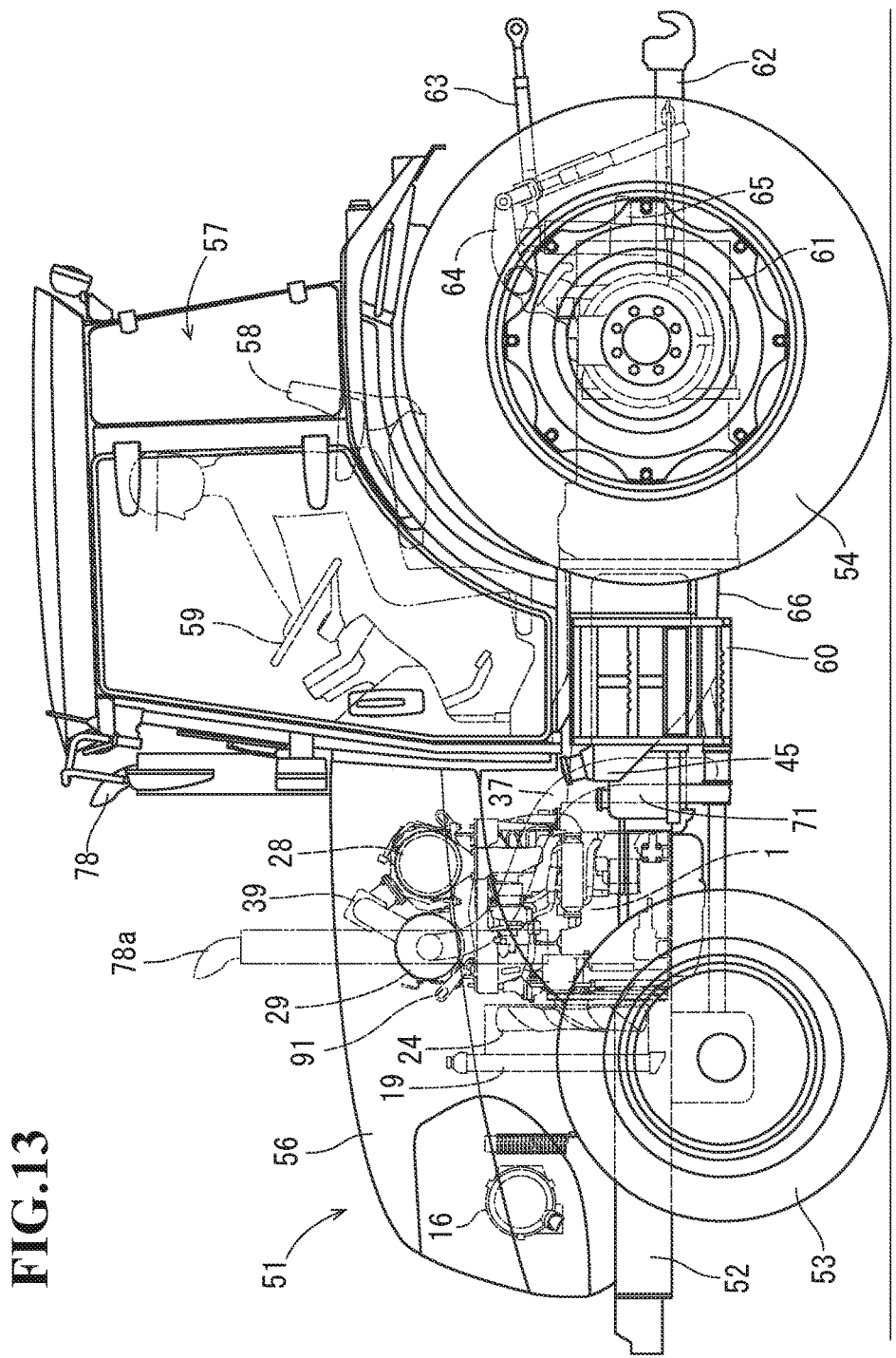
FIG. 13 is a left side elevational view of a tractor which mounts a diesel engine thereon.

A cooling water pump 21 is provided for circulating cooling water within the cylinder block 5 and in a radiator 19 (refer to FIG. 13). The cooling water pump 21 is arranged in a side where a cooling fan 24 is installed in the diesel engine 1. The cooling water pump 21 and the cooling fan 24 are coupled to the engine output shaft 4 via a V-belt 22 and the like, and the cooling water pump 21 and the cooling fan 24 are driven. The cooling water is fed into the cylinder block 5 from the cooling water pump 21 via an EGR cooler 18 of the exhaust gas recirculation device 15, and the diesel engine 1 is adapted to be cooled by a wind of the cooling fan 24.

As shown in FIGS. 1 to 8, as an exhaust gas purification device 27 for purifying the exhaust gas discharged out of the cylinders of the diesel engine 1, there are provided a first case 28 serving as a diesel particulate filter (DPF) which removes particulate matters in the exhaust gas of the diesel engine 1, and a second case 29 serving as a urea selective catalyst reducing (SCR) system which removes nitrogen oxides in the exhaust gas of the diesel engine 1. As shown in FIGS. 1 and 2, an oxidation catalyst 30 and a soot filter 31 are inwardly provided in the first case 28 serving as the DPF case. An SCR catalyst 32 for reducing the urea selective catalyst and an oxidation catalyst 33 are inwardly provided in the second case 29 serving as the SCR case.

The exhaust gas discharged out of the cylinders of the diesel engine 1 to the exhaust manifold 6 is discharged outward via the exhaust gas purification device 27. The exhaust gas purification device 27 is adapted to reduce carbon monoxide (CO), carbon hydride (HC), particulate matter (PM), and nitrogen oxides (NOx) in the exhaust gas of the diesel engine 1.

Figure 4:
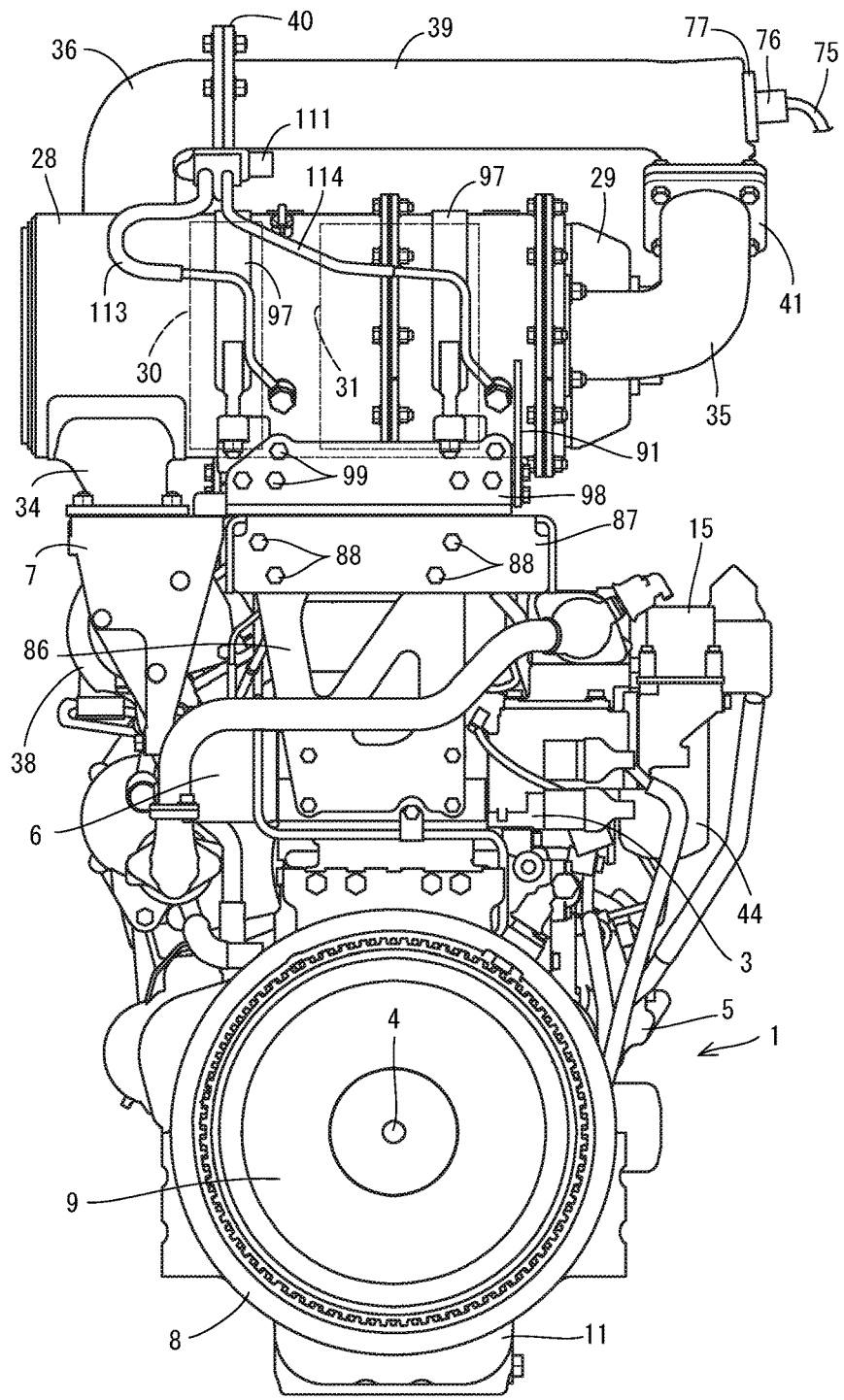
FIG. 4 is a back elevational view of the same.
Figure 5:
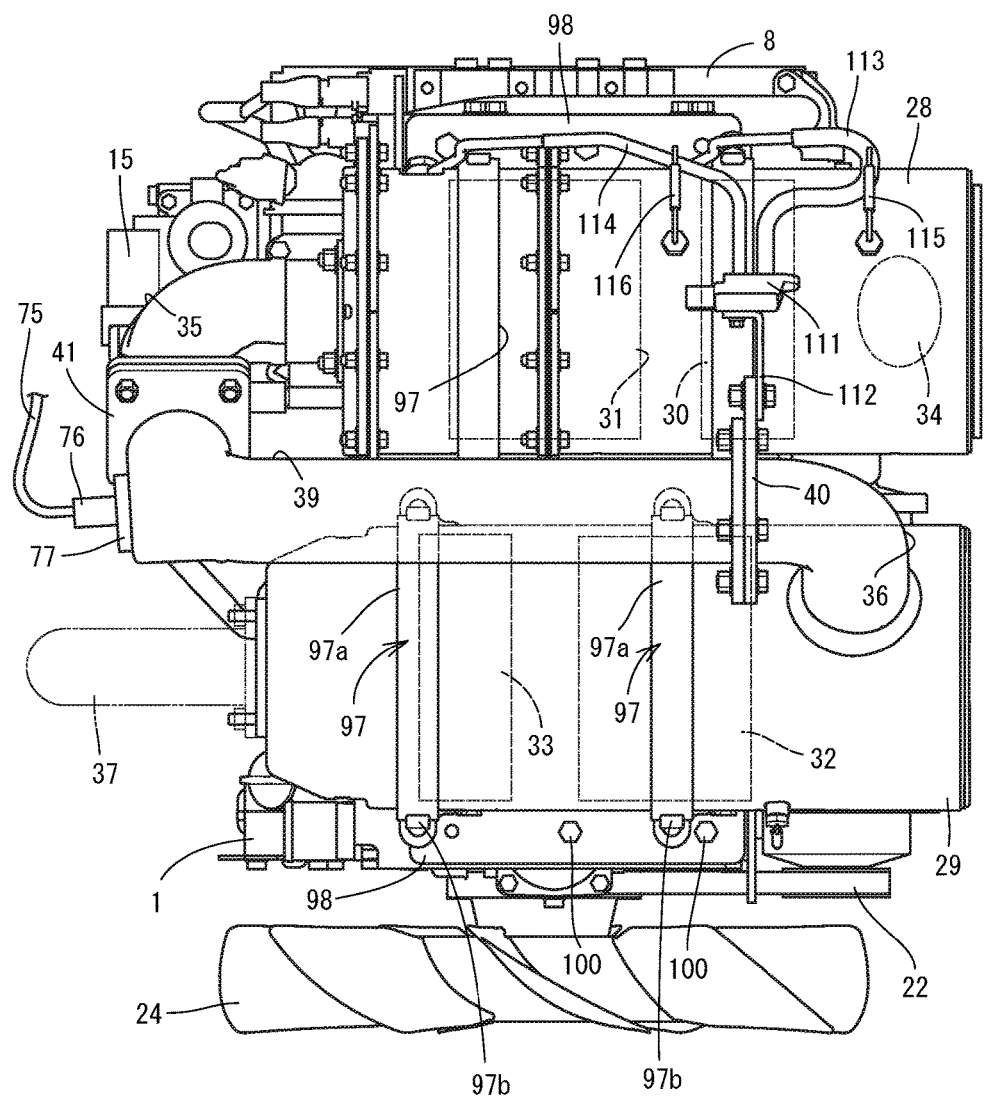
FIG. 5 is a plan view of the same.
Figure 6:
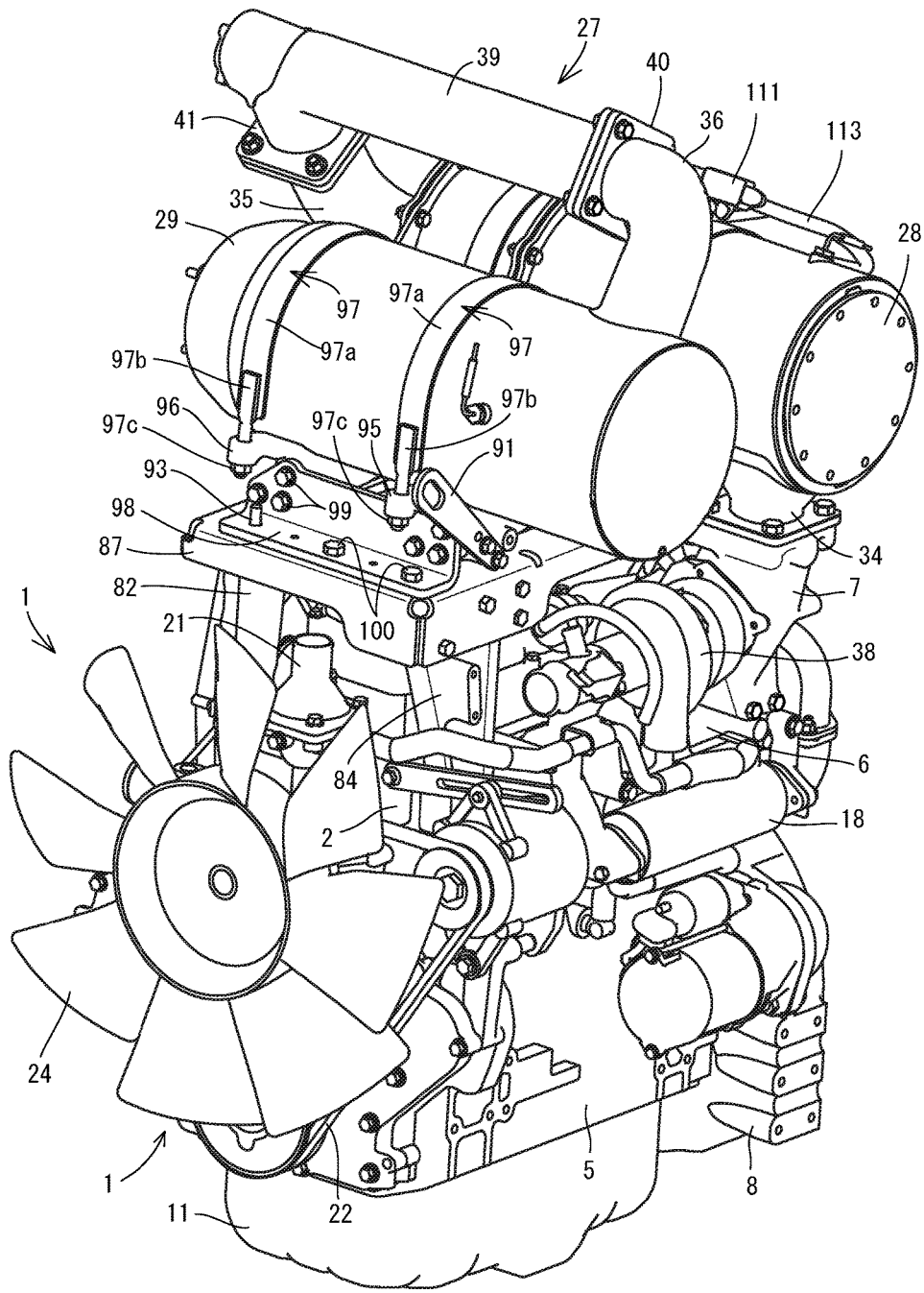
FIG. 6 is a front elevational perspective view of the same.
Figure 7:
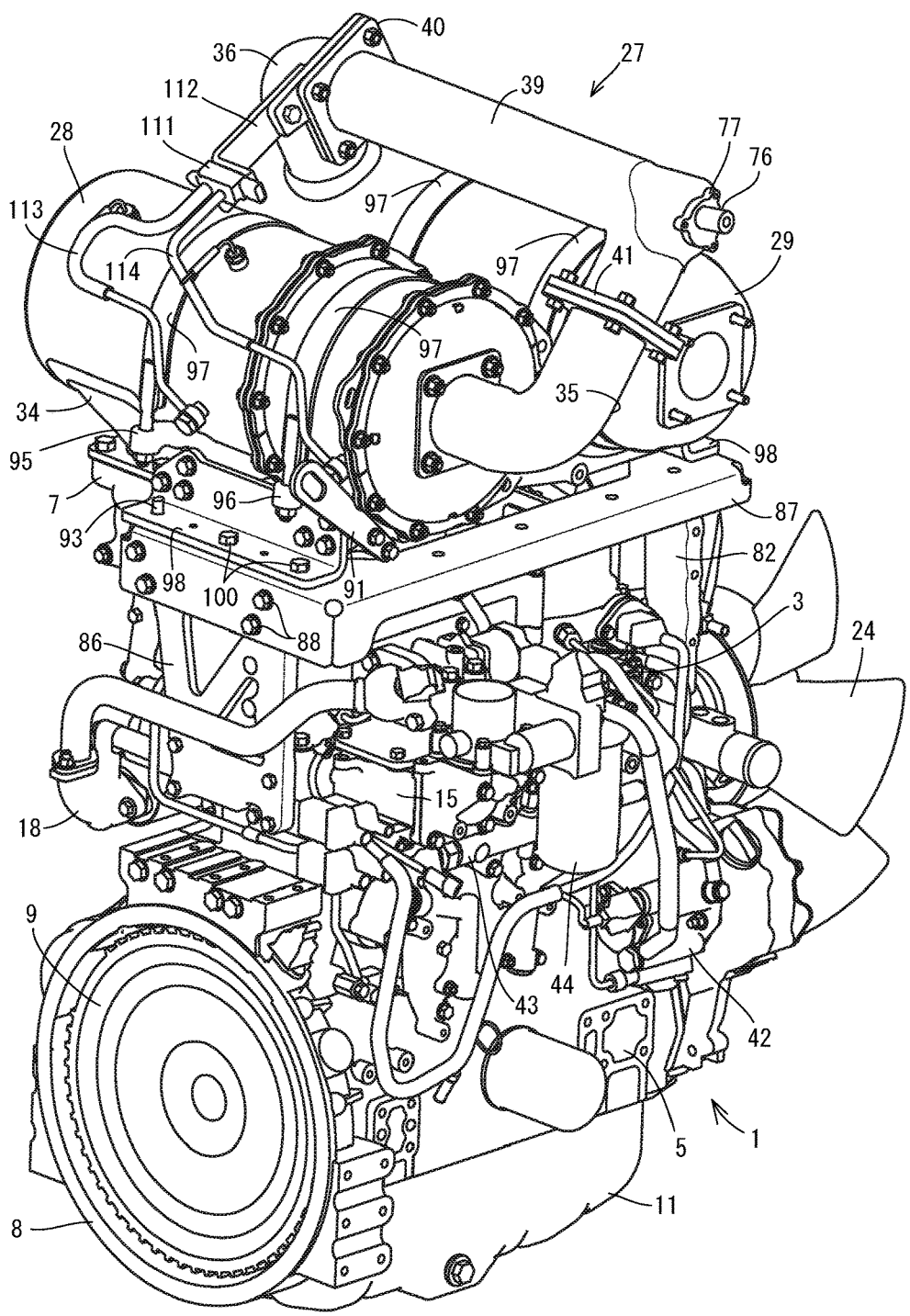
FIG. 7 is a back elevational perspective view of the same.
Figure 8:
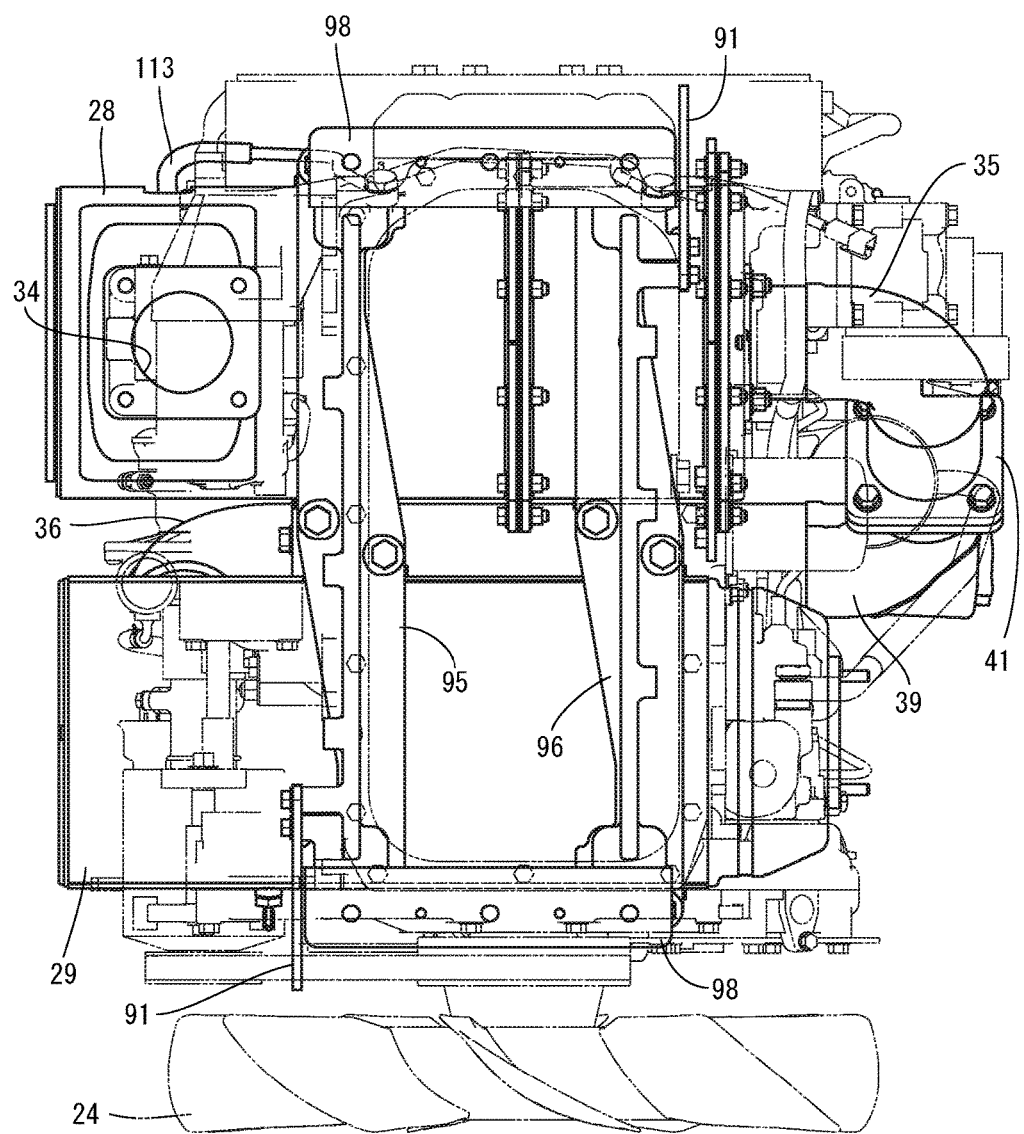
FIG. 8 is a bottom elevational explanatory view of an exhaust gas purification device.
Figure 9:
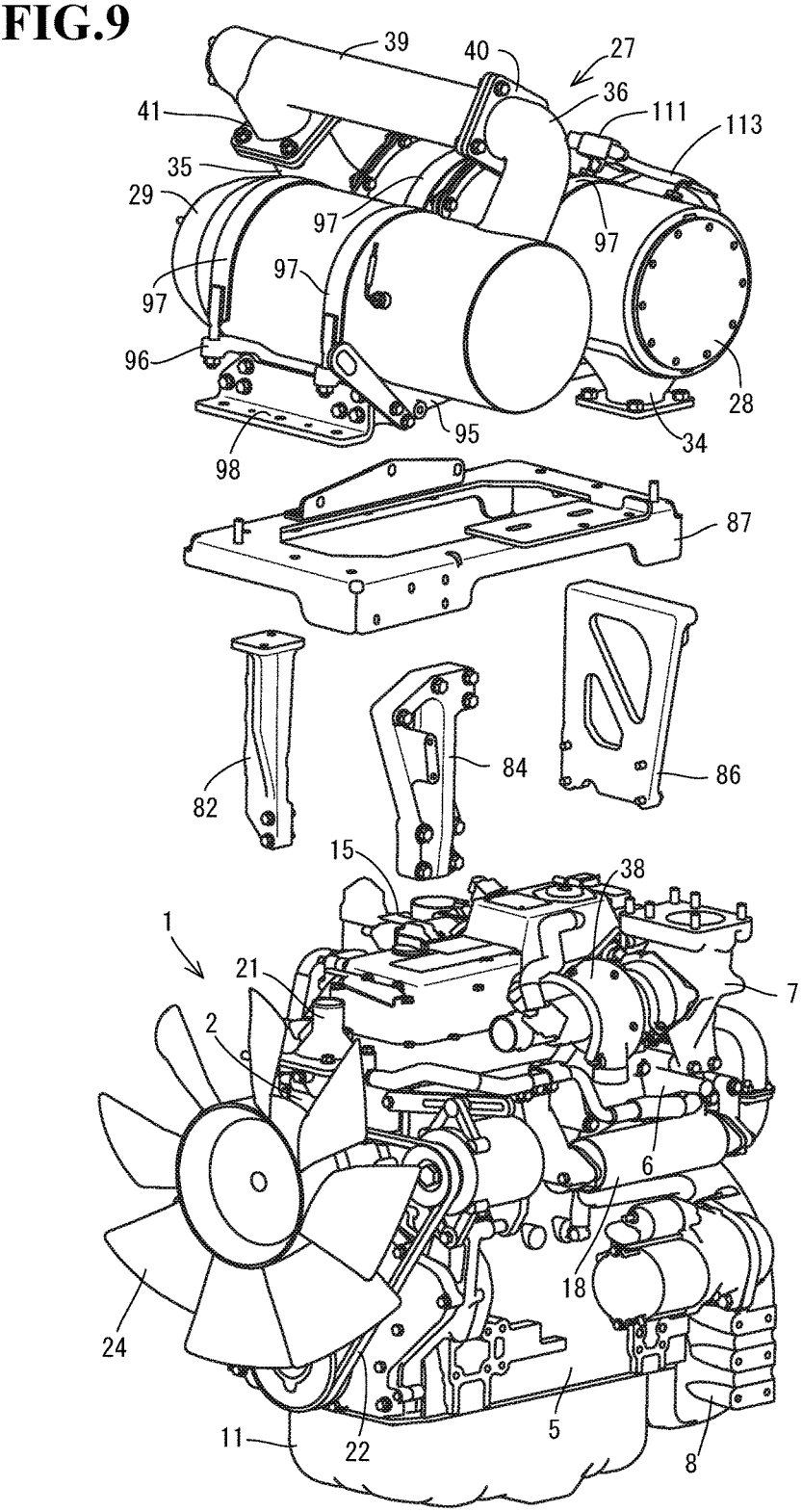
FIG. 9 is a front elevational perspective exploded view of the same.
Figure 10:
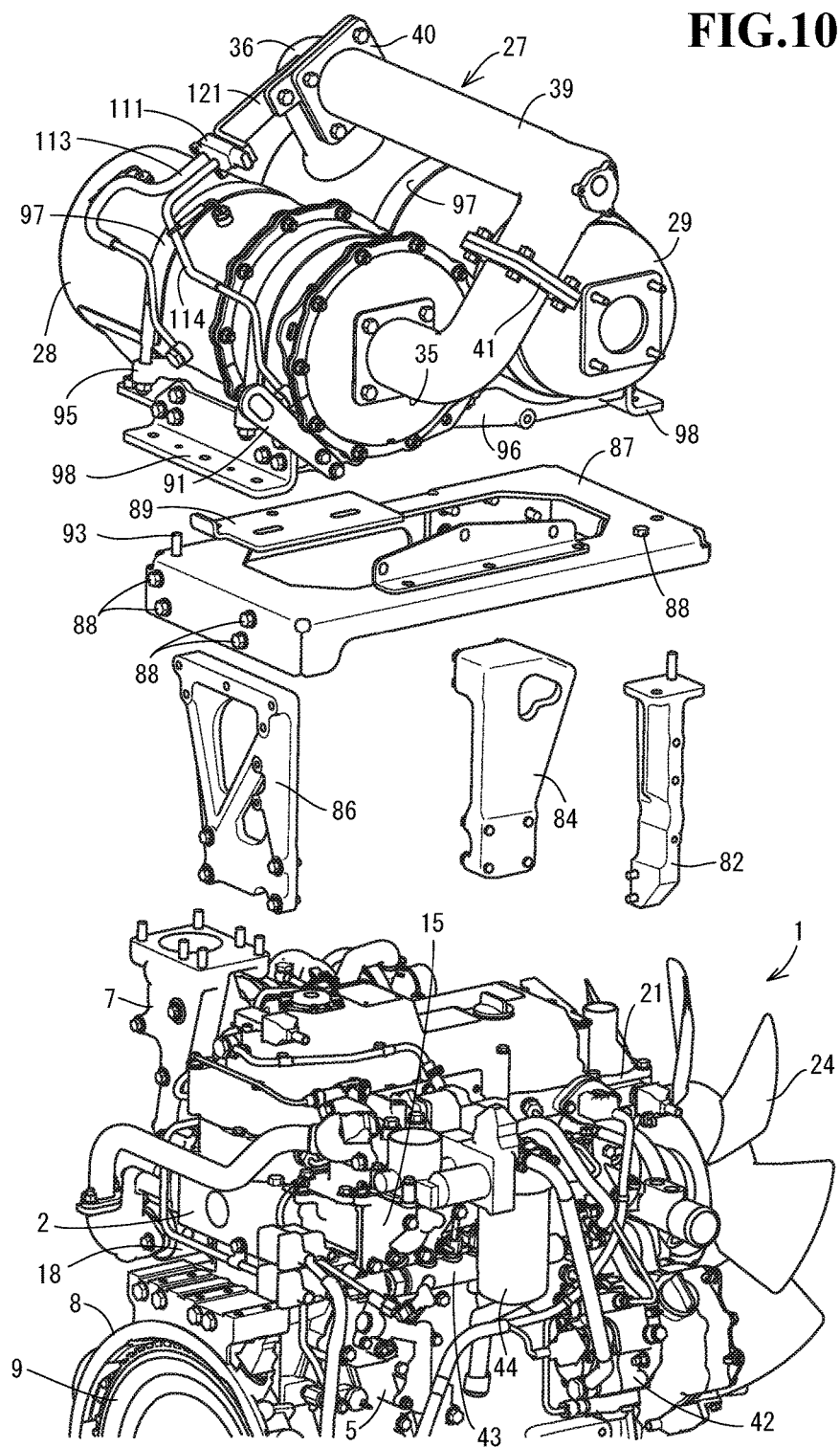
FIG. 10 is a back elevational perspective exploded view of the same.

The first case 28 and the second case 29 are formed into a long cylindrical shape which extends long in an orthogonal direction intersecting the output shaft (the crank shaft) 4 of the diesel engine 1 in a plan view (refer to FIGS. 3 to 5). A DPF inlet pipe 34 taking into the exhaust gas, and a DPF outlet pipe 35 discharging the exhaust gas are provided in both sides (one end side and the other end side in an exhaust gas moving direction) of a tubular shape of the first case 28. In the same manner, an SCR inlet pipe 36 taking into the exhaust gas, and an SCR outlet pipe 37 discharging the exhaust gas are provided in both sides (one end side and the other end side in the exhaust gas moving direction) of the second case 29.

Further, a supercharger 38 forcibly feeding air into the diesel engine 1, and an exhaust gas outlet pipe 7 fastened by bolts to the exhaust manifold 6 are arranged in an exhaust gas outlet of the exhaust manifold 6. The exhaust gas of the diesel engine 1 is adapted to be introduced into the first case 28 by communicating the DPF inlet pipe 34 with the exhaust manifold 6 via the supercharger 38 and the exhaust gas outlet pipe 7, and the exhaust gas of the first case 28 is adapted to be introduced into the second case 29 by connecting the SCR inlet pipe 36 to the DPF outlet pipe 35 via a urea mixing pipe 39. In addition, the DPF outlet pipe 35 and the urea mixing pipe 39 are detachably connected by a DPF outlet side flange body 41 which is fastened by bolts. The SCR inlet pipe 36 and the urea mixing pipe 39 are detachably connected by an SCR inlet side flange body 40.

As shown in FIG. 2, each of injectors (not shown) for multiple cylinders of the diesel engine 1 is provided with a fuel pump 42 to which a fuel tank 45 shown in FIG. 13 (FIG. 14) is connected and a common rail 43. The common rail 43 and a fuel filter 44 are arranged in a side where the intake manifold 3 is installed in the cylinder 2, and the fuel pump 42 is arranged in a cylinder block 5 below the intake manifold 3. Each of the injectors has an electromagnetic opening and closing control type fuel injection valve (not shown).

The fuel within the fuel tank 45 is sucked into the fuel pump 42 via the fuel filter 44. Meanwhile, the common rail 43 is connected to the discharge side of the fuel pump 42, and the cylindrical common rail 43 is connected to each of the injectors of the diesel engine 1. A surplus of the fuel which is pressure fed to the common rail 43 from the fuel pump 42 is returned to the fuel tank 45, the high-pressure fuel is temporarily stored in the common rail 43, and the high-pressure fuel in the common rail 43 is supplied to an inner portion of each of the cylinders of the diesel engine 1.

According to the structure mentioned above, the fuel in the fuel tank 45 is pressure fed to the common rail 43 by the fuel pump 42, the high-pressure fuel is stored in the common rail 43, and the fuel injection valve in each of the injectors is controlled to be opened and closed. As a result, the high-pressure fuel in the common rail 43 is injected to each of the cylinders of the diesel engine 1. In other words, an injection pressure, an injection timing, and an injection period (an injection amount) can be controlled with a high precision by electronically controlling the fuel injection valve in each of the injectors. Therefore, it is possible to reduce the nitrogen oxides (NOx) discharged out of the diesel engine 1.

Figure 14:
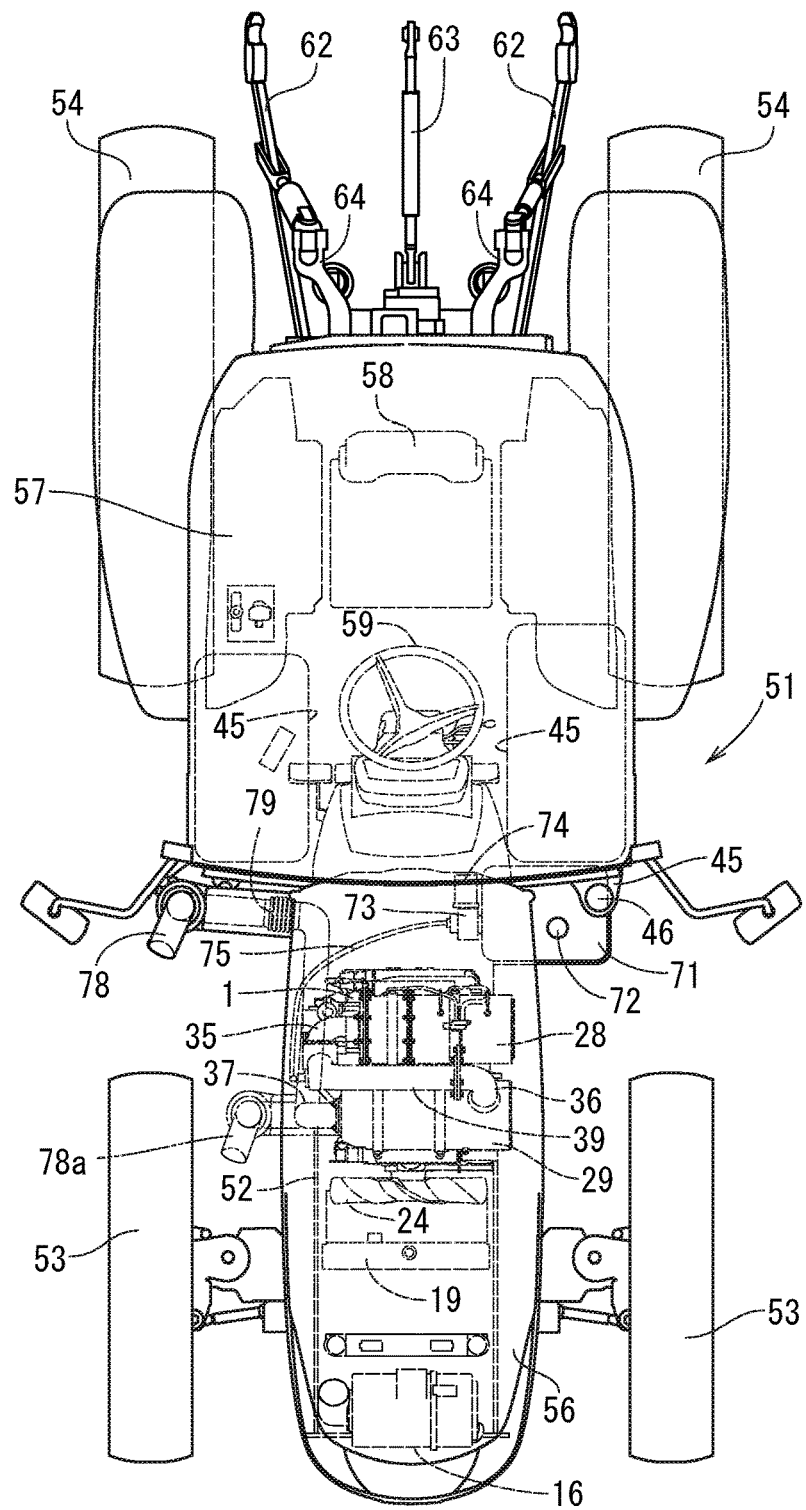
FIG. 14 is a plan view of the same.
Figure 15:
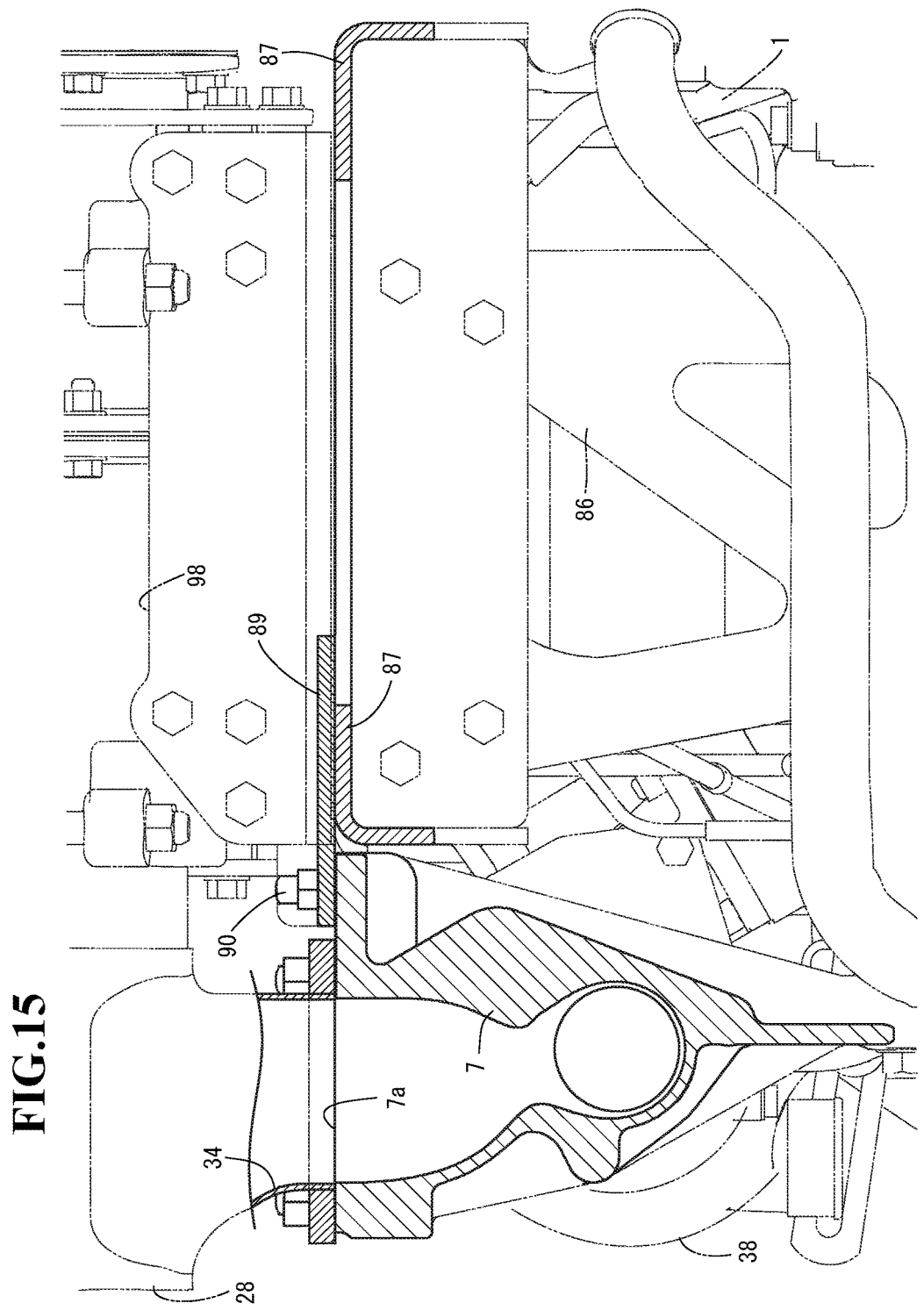
FIG. 15 is a back elevational cross sectional view of a support base portion of an exhaust gas purification device.
Figure 16:
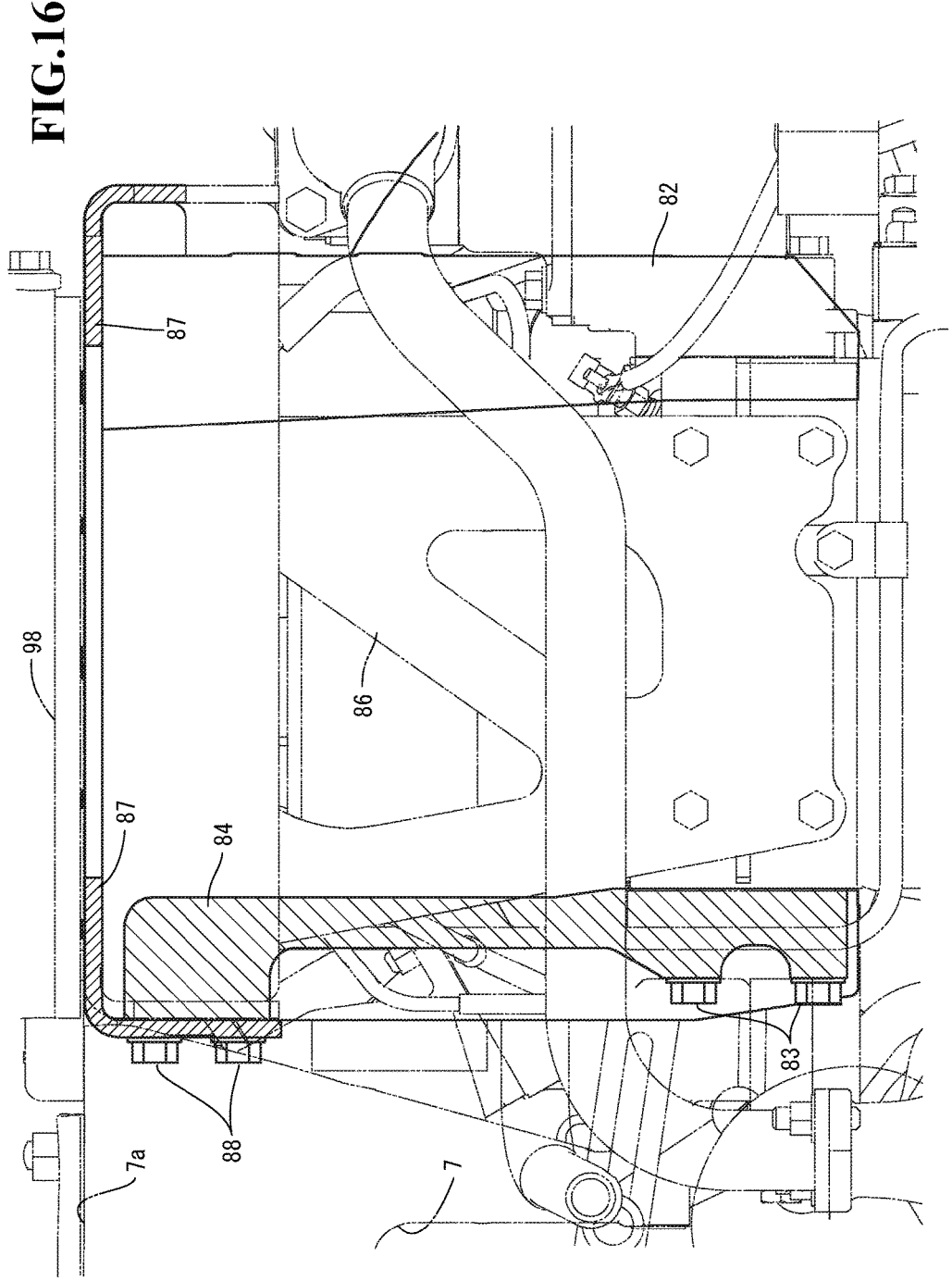
FIG. 16 is a back elevational cross sectional view of a support leg body portion of the same.
Figure 17:
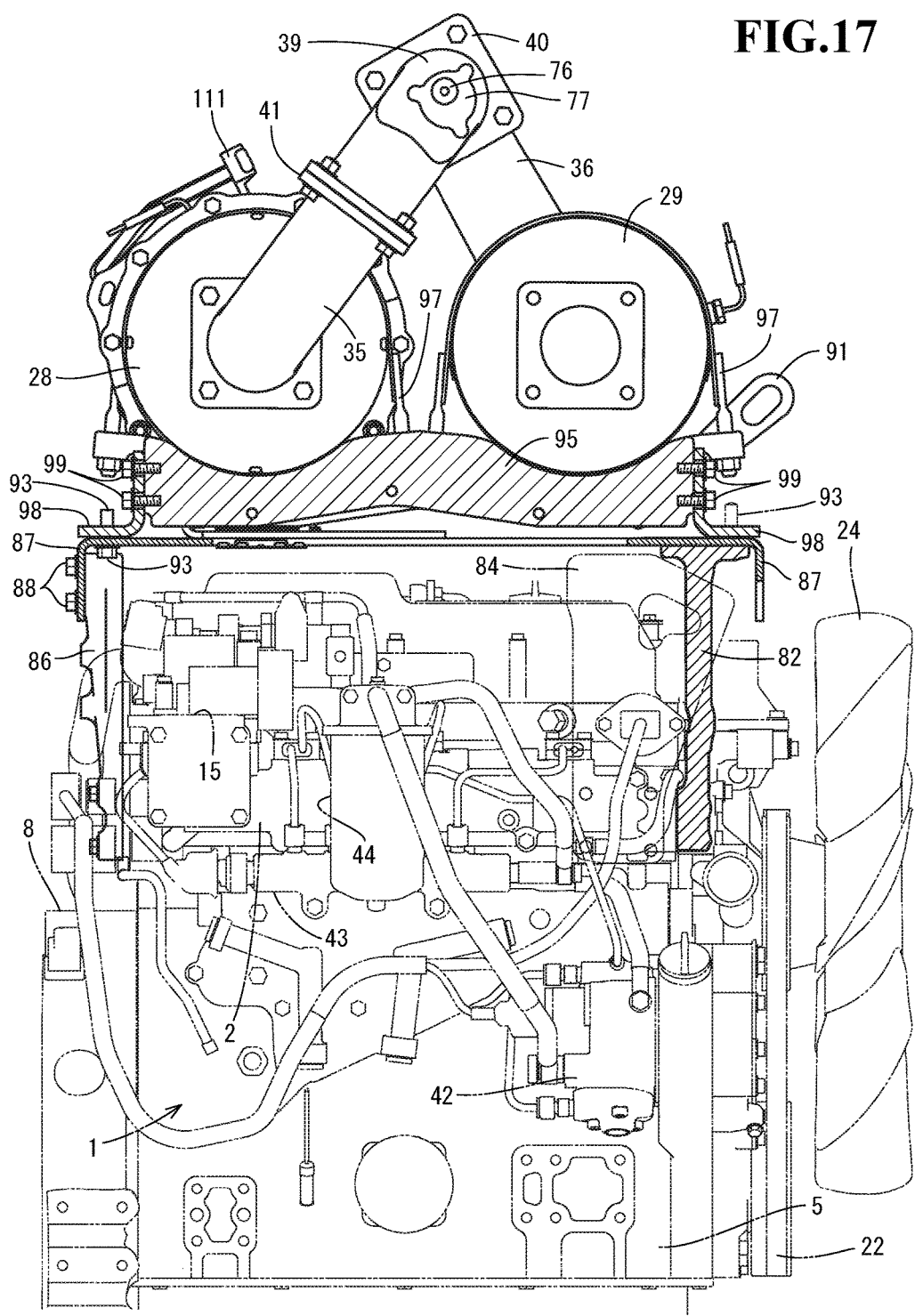
FIG. 17 is a back elevational cross sectional view of a case attachment frame body portion of the same.

Next, a description will be given of a tractor 51 which mounts the diesel engine 1 thereon with reference to FIGS. 13 and 14. The tractor 51 serving as the working vehicle shown in FIGS. 13 and 14 is adapted to perform a tilling work for tilling a farm field by being installed a tilling work machine (not shown). FIG. 13 is a side elevational view of a tractor for an agricultural work, and FIG. 14 is a plan view of the same. In the following description, a left side in a direction toward a forward moving direction of the tractor is simply called as a left side, and a right side in the direction toward the forward moving direction is simply called as a right side.

As shown in FIGS. 13 and 14, the tractor 51 for the agricultural work serving as the working vehicle is adapted to travel forward and backward by supporting a travel machine body 52 by a pair of right and left front wheels 53 and a pair of right and left rear wheels 54, mounting the diesel engine 1 to a front portion of the travel machine body 52, and driving the rear wheels 54 and the front wheels 53 by the diesel engine 1. The upper surface side and both the right and left side surfaces of the diesel engine 1 are covered with a hood 56 which can be opened and closed.

Further, a cabin 57 for an operator to get on is installed in a rear side of the hood 56 among the upper surface of the travel machine body 52. An inner portion of the cabin 57 is provided with a control seat 58 on which the operator seats, and control instruments such as a control steering wheel 59 serving as a steering means. Further, a pair of right and left steps 60 for the operator to get on and off are provided in right and left outside portions of the cabin 57, and a fuel tank 45 for supplying the fuel to the diesel engine 1 is provided in a lower side of a bottom portion of the cabin 57 and inside the step 60.

Further, the travel machine body 52 is provided with a transmission case 61 for changing speed of the output from the diesel engine 1 so as to transmit it to the rear wheels 54 (the front wheels 53). The tilling work machine (not shown) is coupled to a rear portion of the transmission case 61 via a lower link 62, a top link 63, and a lift arm 64 so as to be movable up and down. Further, a PTO shaft 65 driving the tilling work machine is provided in a rear side surface of the transmission case 61. The travel machine body 52 of the tractor 51 is constructed by the diesel engine 1, the transmission case 61, and a crutch case 66 coupling them.

Further, a description will be given of an attachment structure of the first case 28 and the second case 29 with reference to FIGS. 1 to 12 and FIGS. 15 to 17. As shown in FIGS. 9 to 12 and FIGS. 15 to 17, there are provided a front portion support leg body 82 which is fastened its lower end side by bolts 81 to a right corner portion in the front surface of the cylinder head 2, a side portion support leg body 84 which is fastened its lower end side by bolts 83 to a front corner portion in the left side surface of the cylinder head 2, and a rear portion support leg body 86 which is fastened its lower end side by bolts 85 to the rear surface of the cylinder head 2, and the support leg bodies 82, 84, and 86 are provided in a rising manner in the cylinder head 2. A rectangular support base 87 formed by a sheet metal processing is provided, and a side surface and an upper surface side of the support base 87 are fastened by bolts 88 to upper end sides of the support leg bodies 82, 84, and 86. Further, a tabular positioning body 89 is fixed by welding to the upper surface of the support base 87 provided to face to the exhaust gas outlet pipe 7, a part of a tabular lower surface of the positioning body 89 is brought into surface contact with a part of a tabular exhaust gas outlet surface 7a of the exhaust gas outlet pipe 7 which is open upward, and the positioning body 89 is fastened by positioning bolts 90 to the exhaust gas outlet pipe 7. The upper surface of the support base 87 is adapted to be approximately horizontal to the diesel engine 1 on the basis of the surface contact between the exhaust gas outlet pipe 7 and the positioning body 89.

As shown in FIGS. 11 and 12 and FIGS. 15 to 17, a pair of left case fixing body 95 and right case fixing body 96 and four fastening bands 97 are provided as a pinching body which arranges the first case 28 and the second case 29 in parallel. The first case 28 is firmly fixed to rear side mounting portions of the left case fixing body 95 and the right case fixing body 96 by the left and right fastening bands 97, and the second case 29 is firmly fixed to front side mounting portions of the left case fixing body 95 and the right case fixing body 96 by the left and right fastening bands 97. Therefore, the cylindrical first case 28 and second case 29 which are long in the lateral direction are arranged in parallel to the upper surface side of the diesel engine 1, the first case 28 is positioned in the rear side of the upper surface of the diesel engine 1, and the second case 29 is positioned in the front side of the upper surface of the diesel engine 1.

As shown in FIGS. 9 to 12 and FIG. 17, front and rear support frame bodies 98 are fastened by bolts 99 to front and rear end portions of the left case fixing body 95 and the right case fixing body 96 so as to be adjustable their attachment positions (support attitudes), the left and right case fixing bodies 95 and 96 and the front and rear support frame bodies 98 are connected like a quadrangular frame shape, and the first case 28 and the second case 29 are firmly fixed thereto via the fastening bands 97, thereby constructing the exhaust gas purification device 27 serving as the exhaust gas purification unit. The bolt 99 is loosely fitted and inserted to a bolt through hole of the support frame body 98 by forming an inner diameter of the bolt through hole of the support frame body 98 larger than an outer diameter of the bolt 99, and the support frame body 98 is adapted to be fastened by the bolts 99 to the case fixing bodies 95 and 96 by threadably attaching the bolts 99 to the case fixing bodies 95 and 96 while supporting the connection attitude of the support frame bodies 98 to the case fixing bodies 95 and 96 in a predetermined attitude when the case fixing bodies 95 and 96 are firmly fixed to the support frame bodies 98.

Further, left and right suspension members 91 are fastened by bolts 92 to a front end side of the left case fixing body 95 and a rear end side of the right case fixing body 96, and the left and right suspension members 91 are arranged at diagonal positions of the quadrangular frame of the left and right case fixing bodies 95 and 96 and the front and rear support frame bodies 98. Meanwhile, front and rear temporary fixing bolt bodies 93 are provided in a rising manner on an upper surface of the approximately horizontal support base 87, and the front and rear temporary fixing bolt bodies 93 are arranged at diagonal positions which are opposite sides to the diagonal layout of the left and right suspension members 91. More specifically, the left and right suspension members 91 and the front and rear temporary fixing bolt bodies 93 are arranged in a sorting manner at apex angle positions of the quadrangular frame of the left and right case fixing bodies 95 and 96 and the front and rear support frame bodies 98.

Next, a description will be given of an assembling procedure for assembling the exhaust gas purification device 27 (the exhaust gas purification unit) in the diesel engine 1. As shown in FIGS. 9 to 12, the exhaust gas purification device 27 is first of all assembled. A pair of support frame bodies 98 formed into an L-shape in their end surfaces and made of a sheet metal are fastened by the bolts 99 to both end portions of the left case fixing body (the pinching body) 95 and the right case fixing body (the pinching body) 96. When fastening the bolts 99, the case fixing bodies 95 and 96 and the support frame bodies 98 are connected like the quadrangular frame shape by fastening the bolts 99 while adjusting the connection positions of the case fixing bodies 95 and 96 and the support frame bodies 98 with the use of backlash between the bolt holes of the support frame bodies 98 and the bolts 99 so that the upper surface height of the left case fixing body 95 is flush with the upper surface height of the right case fixing body 96.

Subsequently, the first case 28, the second case 29, and the urea mixing pipe 39 are integrally connected by fastening the other end side of the urea mixing pipe 39 by bolts to the SCR inlet pipe 36 via the SCR inlet side flange body 40 as well as mounting the first case 28 and the second case 29 in a predetermined direction (in parallel) to an upward concave support portion in the upper surface side of the case fixing bodies 95 and 96, and fastening the DPF outlet side flange body 41 by bolts to the DPF outlet pipe 35. Further, the assembly of the exhaust gas purification device 27 is finished by fastening the suspension members 91 by the bolts 92 to the case fixing bodies 95 and 96 as well as installing the respective two fastening bands 97 to the respective upper surface sides of the first case 28 and the second case 29 like a half winding manner, and fastening the lower end sides of the fastening bands 97 by bolts to the case fixing bodies 95 and 96. A differential pressure sensor 111 is attached to a sensor bracket 112 by fastening the sensor bracket 112 by bolts to the SCR inlet side flange body 40 when the SCR inlet side flange body 40 is fastened by bolts.

Meanwhile, the support leg bodies 82, 84, and 86 are provided in a rising manner in the cylinder head 2 by fastening the respective lower end sides of the front portion support leg body 82, the side portion support leg body 84, and the rear portion support leg body 86 by the bolts 81, 83, and 85 to the cylinder head 2 of the diesel engine 1 which is substantially finished its assembling work, near the final assembling step of the assembly line (the engine assembly place) of the diesel engine 1. Next, the support base 87 is fixed in a horizontal attitude to the upper surface side of the diesel engine 1 by fastening the support base 87 by the bolts 88 to the support leg bodies 82, 84, and 86 under a state in which the upper surface of the support base 87 is supported approximately horizontally by mounting the support base 87 to the upper end sides of the support leg bodies 82, 84, and 86 and bringing the lower surface of the positioning body 89 into surface contact with the exhaust gas outlet surface 7a of the exhaust gas outlet pipe 7.

Further, the assembling work for assembling the exhaust gas purification device 27 in the diesel engine 1 is finished by mounting the front and rear support frame bodies 98 to the approximately horizontal upper surface of the support base 87 from the above side via the front and rear temporary fixing bolt bodies 93, fastening the front and rear support frame bodies 98 by bolts 100 to the support base 87, and combining the exhaust gas purification device 27 (the first case 28 and the second case 29) with the upper surface side of the diesel engine 1 as well as suspending the exhaust gas purification device 27 which is finished its assembly as mentioned above to a material handling attachment (a hoist or a chain block) which is not illustrated, via the suspension member 91, in the work place near the end of the assembly step of the diesel engine 1, and conveying the exhaust gas purification device 27 to the upper surface side of the diesel engine 1 in which the support base 87 is assembled as mentioned above.

Further, the urea mixing pipe 39 is arranged between the first case 28 and the second case 29 in parallel to them. The first case 28, the second case 29, and the urea mixing pipe 39 are supported via the upper surface of the support base 87 at the position which is higher than a cooling air path (a shroud 101 shown in FIG. 1) of the cooling fan 24, and the front side (the lateral side) of the urea mixing pipe 39 is closed by the second case 29. A temperature of the exhaust gas within the urea mixing pipe 39 is prevented from being lowered by the cooling air of the cooling fan 24 and the like, and the urea water supplied into the urea mixing pipe 39 is prevented from being crystallized. Further, the urea water supplied into the urea mixing pipe 39 is adapted to be mixed as ammonia in the exhaust gas running into the second case 29 from the first case 28.

As shown in FIGS. 1 to 12, in the engine device of the working vehicle having the first case 28 which removes the particulate matter in the exhaust gas of the diesel engine 1, and the second case 29 which removes the nitrogen oxides in the exhaust gas of the diesel engine 1, and connecting the second case 29 to the first case 28 via the urea mixing pipe 39, the case fixing bodies 95 and 96 are provided for firmly fixing the first case 28 and the second case 29, and the suspension member 91 is firmly fixed to the case fixing bodies 95 and 96. Therefore, the exhaust gas purification device 27 is supported in a suspension manner to the material handling attachment via the suspension member 91 in a state in which the cases 28 and 29 are integrally assembled as the exhaust gas purification device (the exhaust gas purification unit) 27 by the case fixing bodies 95 and 96. The exhaust gas purification device 27 which is a mass-production part can be easily handled in an assembling and disassembling work for attaching and detaching the exhaust gas purification device 27 to and from the upper surface side of the diesel engine 1.

As shown in FIGS. 1 to 12, the exhaust gas purification device 27 serving as the exhaust gas purification unit is formed by connecting the urea mixing pipe 39 between the first case 28 and the second case 29 which are firmly and integrally fixed by the case fixing bodies 95 and 96, and a pair of suspension members 91 are arranged in a facing manner to the outer peripheral sides of the diagonal positions in a plan view in the outer peripheral side of the exhaust gas purification device 27. Therefore, the exhaust gas purification device 27 can be easily assembled in the diesel engine 1 in the assembly step near the end of the assembly step of the diesel engine 1, and the exhaust gas purification device 27 can be easily detached from the diesel engine 1 in a maintenance work or a repair work of the diesel engine 1.

As shown in FIGS. 1 to 12, the lower surface side of the support base 87 is connected to the upper surface side of the diesel engine 1 via a plurality of support leg bodies 82, 84, and 86, the support base 87 is arranged in the upper surface side of the diesel engine 1, and the case fixing bodies 95 and 96 are firmly fixed detachably to the approximately horizontal upper surface side of the support base 87. Therefore, it is possible to easily improve an assembly workability of the diesel engine 1 or a maintenance workability of the diesel engine 1 while it is possible to easily reduce the upper surface side of the diesel engine 1 from being interfered with the attached part and the like.

As shown in FIGS. 1 to 12, in the structure in which the cooling fan 24 is provided in one side of the diesel engine 1, the height of the approximately horizontal upper surface of the support base 87 is formed higher than the height of the upper portion of the cooling fan 24. Therefore, it is possible to prevent the temperature of the exhaust gas purification device 27 serving as the exhaust gas purification unit from being lowered by the wind of the cooling fan 24, and it is possible to keep the exhaust gas purification device 27 at a predetermined temperature or higher so as to improve an exhaust gas purification efficiency, while an air cooling efficiency of the diesel engine 1 can be appropriately maintained by moving the wind of the cooling fan 24 to the lower surface side of the support base 87.

As shown in FIGS. 1 to 12, in the engine device of the working vehicle having the first case 28 which removes the particulate matter in the exhaust gas of the diesel engine 1, and the second case 29 which removes the nitrogen oxides in the exhaust gas of the diesel engine 1, and connecting the second case 29 to the first case 28 via the urea mixing pipe 39, the exhaust gas purification unit (the exhaust gas purification device 27) is formed by firmly and integrally fixing the first case 28 and the second case 29 by the case fixing bodies 95 and 96, the fastening bands 97, and the support bodies 98 which serve as the pinching body, and the exhaust gas purification device 27 serving as the exhaust gas purification unit is adapted to be detachably supported to the diesel engine via the case fixing bodies 95 and 96, the fastening bands 97, and the support bodies 98. Therefore, the diesel engine 1 and the exhaust gas purification device 27 can be integrally constructed into the same vibration structure, and it is possible to construct the exhaust gas discharge channel in the diesel engine 1 and the exhaust gas purification device 27 at a low cost without necessity of vibration isolation connection of the exhaust connection portions of the first case 28 and the second case 29. Further, the exhaust gas purification device 27 can be previously assembled in the different place from the assembling work place of the diesel engine 1, and the exhaust gas purification device 27 can be mounted to the diesel engine 1 near the final step of the assembling work of the diesel engine 1. As a result, it is possible to improve the assembly workability of the diesel engine 1.

As shown in FIGS. 1 to 12, the support base 87 is firmly fixed approximately horizontally to the upper surface side of the diesel engine 1, the case fixing bodies 95 and 96 are firmly fixed to the upper surface side of the support base 87 via the support frame body 98, the first case 28 and the second case 29 are supported in a sideways falling attitude to the upper surface side of the diesel engine 1 via the case fixing bodies 95 and 96 and the fastening bands 97, and the urea mixing pipe 39 is supported between the first case 28 and the second case 29 to the upper surface sides thereof. Therefore, the exhaust gas purification device 27 can be easily assembled and disassembled by connecting and disconnecting the support base 87 and the support frame body 98, and the first case 28 and the second case 29 can be compactly supported to the upper surface side of the diesel engine 1 at a low level. Further, it is possible to maintain the attachment distance between the first case 28 and the second case 29 constant via the case fixing bodies 95 and 96 and the fastening bands 97, and it is possible to simplify an exhaust gas piping structure of the urea mixing pipe 39 and the like between the cases 28 and 29.

As shown in FIGS. 9 to 12, the exhaust gas purification device 27 is adapted to be mounted to the upper surface side of the diesel engine 1 via the support base 87 by firmly fixing the lower end sides of a plurality of support leg bodies 82, 84, and 86 to the outer peripheral surface of the cylinder head 2 of the diesel engine 1, and detachably connecting the approximately horizontal support base 87 to the upper end sides of a plurality of support leg bodies 82, 84, and 86. Therefore, it is possible to easily execute a maintenance work of the upper surface side of the diesel engine 1 by attaching and detaching the connection portions between a plurality of support leg bodies 82, 84, and 86, and the support base 87, disconnecting the support base 87, and leaving the upper surface side of the diesel engine 1 open widely. Further, the support base 87 can be firmly connected to the cylinder head 2 via a plurality of support leg bodies 82, 84, and 86, and the exhaust gas purification device 27 can be supported with a high rigidity to the upper surface side of the diesel engine 1.

As shown in FIGS. 1 to 7, the exhaust gas purification device 27 is supported within a width in a core wire direction of the output shaft 4 of the diesel engine 1 via the support base 87, and a direction intersecting the core wire of the output shaft 4 of the diesel engine 1 is adapted to coincide with the exhaust gas moving direction of the first case 28 or the second case 29. Therefore, the exhaust gas purification device 27 can be supported in an attitude that the exhaust gas outlet of the second case 29 heads for the intake manifold 3 side of the diesel engine 1 by aiming the exhaust gas inlet of the first case 28 to the exhaust manifold 6 side of the diesel engine 1. It is possible to form the exhaust gas channel from the exhaust manifold 6 of the diesel engine 1 to the exhaust gas outlet of the second case 29 short, and it is possible to compactly mount the exhaust gas purification device 27 to the upper surface side of the diesel engine 1.

Meanwhile, the exhaust gas purified by the second case 29 is discharged from a tail pipe 78 toward an upper side of the cabin 57 by disposing the tail pipe 78 in a rising manner on a front surface of a right corner portion of the cabin 57 in the front surface of the cabin 57, extending a lower end side of the tail pipe 78 toward an inner portion of the hood 56, and connecting a lower end side of the tail pipe 78 to the SCR outlet pipe 37 via a bellows tubular flexible pipe 79, as shown in FIGS. 13 to 14. The machine vibration transmitted to the tail pipe 78 side from the diesel engine 1 side is reduced by the connection of the flexible pipe 79. Further, a urea water tank 71 is installed to a left side portion of the hood 56 in an opposite side to a right side portion where the tail pipe 78 is arranged, in the front surface of the cabin 57. More specifically, the urea water tank 71 is arranged in a sorting manner in the left side portion of the rear portion of the hood 56 while the tail pipe 78 is arranged in the right side portion of the rear portion of the hood 56. As shown by virtual lines in FIGS. 13 and 14, the tail pipe 78 can be integrally connected to the SCR outlet pipe 37 and the flexible pipe 79 can be omitted, in a structure having a tail pipe 78a which is firmly fixed to the diesel engine 1 side.

Further, the urea water tank 71 is mounted to the travel machine body 52 (a bottom portion frame of the cabin 57 and the like) in the leftward rear portion of the hood 56. An oil hole 46 of the fuel tank 45 and a water filler 72 of the urea water tank 71 are adjacently provided in a lower portion of a front surface in the left side of the cabin 57. The tail pipe 78 is arranged in the front surface in the right side of the cabin 57 where an operator gets on and off with low frequency, and the oil hole 46 and the water filler 72 are arranged in the front surface in the left side of the cabin 57 where the operator gets on and off with high frequency. The cabin 57 is structured such that the operator can get on and off the control seat 58 from any of the left side and the right side.

Further, as shown in FIGS. 3 to 5 and FIG. 14, there are provided a urea water injection pump 73 which pressure feeds the urea water solution within the urea water tank 71, an electric motor 74 which drives the urea water injection pump 73, and a urea water injection nozzle 76 which is connected to the urea water injection pump 73 via a urea water injection pipe 75. The urea water injection nozzle 76 is attached to the urea mixing pipe 39 via an injection pedestal 77, and the urea water solution is sprayed into an inner portion of the urea mixing pipe 39 from the urea water injection nozzle 76.

According to the structure mentioned above, the carbon monoxide (CO) and the carbon hydride (HC) in the exhaust gas of the diesel engine 1 can be reduced by the oxidation catalyst 30 and the soot filter 31 within the first case 28. Next, the urea water from the urea water injection nozzle 7 is mixed into the exhaust gas from the diesel engine 1 in the inner portion of the urea mixing pipe 39. Further, the nitrogen oxides (NOx) in the exhaust gas mixed with the urea water as ammonia is reduced by the SCR catalyst 32 and the oxidation catalyst 33 within the second case 29, and is discharged out of the tail pipe 78 toward the machine outside.

As shown in FIGS. 1 to 12 and FIG. 15, in the engine device of the working vehicle having the first case 28 which removes the particulate matter in the exhaust gas of the diesel engine 1, and the second case 29 which removes the nitrogen oxides in the exhaust gas of the diesel engine 1, and connecting the second case 29 to the first case 28 via the urea mixing pipe 39, the engine device is provided with the support leg bodies 82, 84, and 86 which are protruded from the diesel engine 1, and the support base 87 which is firmly fixed to the support leg bodies 82, 84, and 86, and the first case 28 and the second case 29 are adapted to be attached to the plane of the support base 87. Therefore, the support base 87 can be firmly and easily fixed to the diesel engine 1 via the support leg bodies 82, 84, and 86 according to a retrofitting work (near an end of the assembly step of the diesel engine 1), the first case 28 and the second case 29 can be supported to the support base 87 of the diesel engine 1 in an appropriate attitude, and it is possible to improve an attachment and detachment workability of the first case 28 and the second case 29.

As shown in FIGS. 1 to 12 and FIG. 15, the upper surface side of the support base 87 is adapted to be approximately horizontal when the support base 87 is fixed to the support leg bodies 82, 84, and 86, by bringing the plane of the support base 87 (the bottom surface of the positioning body 89) into surface contact with the horizontal surface (the exhaust gas outlet surface 7a) of the exhaust gas outlet portion (the exhaust gas outlet pipe 7) in the outer surface of the diesel engine 1, and joining the support base 87 to the outer surface of the diesel engine 1 via the horizontal surface (the exhaust gas outlet surface 7a) in the outer side of the diesel engine 1 and the plane of the support base 87 (the bottom surface of the positioning body 89). Therefore, the attachment strength can be easily secured by forming the support base 87 into a sheet metal structure having a high rigidity while an attachment angle of the support base 87 can be easily determined by the connection of the exhaust gas outlet pipe 7 (the exhaust gas outlet portion) and the support base 87. For example, it is possible to improve an assembly workability where the attachment angle of the support base 87 is formed horizontally to the diesel engine 1.

As shown in FIGS. 1 to 12 and FIG. 15, the upper surface side of the support base 87 is adapted to be approximately horizontal by firmly and integrally fixing the positioning body 89 to the support base 87, bringing the positioning body 89 into surface contact with the opening surface (exhaust gas outlet surface 7a) of the exhaust gas outlet portion (the exhaust gas outlet pipe 7) in the diesel engine 1, and joining the support base 87 to the diesel engine 1 side via the positioning body 89. Therefore, the support body 87 and the positioning body 89 can be connected according to a welding process or the like after the support base 87 is formed according to a press work or the like, so that the lower surface of the positioning body 89 can be formed precisely in parallel to the upper surface of the support base 87. The upper surface side of the support base 87 can be formed approximately horizontal by the surface contact between the diesel engine 1 side and the positioning body 89 without any special preparation of a connection jig of the support base 87. Since the positioning body 89 is provided as the connection jig of the support base 87, it is possible to easily execute the attaching and detaching work of the support base 87 even in a repairing place for the diesel engine 1 where the connection jig of the support base 87 is not prepared.

As shown in FIGS. 1 to 12 and FIG. 15, in the structure in which the first case 28 and the second case 29 are integrally formed into the exhaust gas purification unit (the exhaust gas purification device 27), the exhaust gas purification unit (the exhaust gas purification device 27) are adapted to be integrally attached to and detached from the flat upper surface side of the support base 87 which is firmly fixed its lower surface side to the support leg bodies 82, 84, and 86. Therefore, each of the cases 28 and 29 can be attached and detached as a single part, and it is possible to improve the assembly and disassembly workability of the cases 28 and 29 or the maintenance workability of the diesel engine 1.

As shown in FIGS. 1 to 8, in the engine device of the working vehicle having the first case 28 which removes the particulate matter in the exhaust gas of the diesel engine 1, and the second case 29 which removes the nitrogen oxides in the exhaust gas of the diesel engine 1, and connecting the second case 29 to the first case 28 via the urea mixing pipe 39, the diesel engine 1, the first case 28 and the second case 29 are adapted to be freely and integrally oscillated by firmly and integrally fixing the diesel engine 1, the first case 28, and the second case 29. Therefore, the diesel engine 1, the first case 28, and the second case 29 can be constructed as the same vibration structure, it is not necessary to connect the exhaust passage between the diesel engine 1 and the first case 28 or the exhaust passage between the first case 28 and the second case 29 in a vibration isolation manner, and it is possible to construct the exhaust gas channel structure between the diesel engine 1 and the second case 29 with a low cost. More specifically, since a vibration isolation member, for example, a bellows-like flexible pipe or a heat resistant rubber hose is not necessarily connected in the exhaust gas channel between the first case 28 and the second case 29, it is possible to construct the exhaust gas channel structure between the diesel engine 1 and the second case 29 with a low cost.

As shown in FIGS. 1 to 10, a plurality of support leg bodies 82, 84, and 86 are provided in a rising manner in the cylinder head 2 of the diesel engine 1, the support base 87 is connected to the upper end sides of a plurality of support leg bodies 82, 84, and 86, and the first case 28 and the second case 29 are firmly fixed to the upper surface side of the diesel engine 1 via the approximately horizontal support base 87. Therefore, the support base 87 can be easily spaced from the attached parts of the diesel engine 1. Further, the first case 28 and the second case 29 can be firmly fixed to the cylinder head 2 with a high rigidity as well as the exhaust gas piping of each of the cases 28 and 29 can be simplified by integrally attaching the first case 28 and the second case 29 to the diesel engine 1. In addition, it is possible to absorb a working error or the like of the attachment part such as the support base 87, it is possible to easily compensate an angle of incline for the attachment of the support base 87, and it is possible to support the first case 28 and the second case 29 in a predetermined attitude, by adjusting the connection portions between a plurality of support leg bodies 82, 84, and 86 and the support base 87. It is possible to easily improve the assembly workability for assembling the first case 28 and the second case 29 in the diesel engine 1.

As shown in FIGS. 1 to 8, the DPF inlet pipe 34 of the first case 28 is arranged in the side where the exhaust manifold 6 of the diesel engine 1 is installed, the first case 28 is attached so that the exhaust gas in the first case 28 can move in the direction which intersects the axis of the output shaft of the diesel engine 1, and the second case 29 is provided side by side in the lateral side close to the installation side of the cooling fan 24 of the diesel engine 1 in the lateral side of the first case 28. Therefore, the first case 28 and the second case 29 can be compactly arranged in a close contact manner in the upper surface side of the diesel engine 1. On the contrary, it is possible to reduce the temperature reduction of the first case 28 due to the wind of the cooling fan 24 by interposing the second case 29 between the cooling fan 24 and the first case 28. Further, the second case 29 is interposed between the cooling fan 24 and the urea mixing pipe 39 by supporting the urea mixing pipe 39 supplying the exhaust gas to the second case 29 from the first case 28 between the first case 28 and the second case 29, so that it is possible to reduce the temperature reduction of the urea mixing pipe 39 due to the wind of the cooling fan 24.

As shown in FIGS. 1 to 8, FIG. 13 and FIG. 14, in the working vehicle in which the operation cabin 57 is arranged in a rear side of the hood 56 inwardly provided with the diesel engine 1, the urea water tank 71 for the exhaust gas purification is installed between the front portion of the operation cabin 57 and the rear portion of the diesel engine 1. Therefore, it is possible to heat up the urea water tank 71 on the basis of an exhaust heat of the diesel engine 1, it is possible to maintain the temperature of the urea water solution within the urea water tank 71 at a predetermined temperature or higher, and it is possible to prevent the exhaust gas purification capacity of the second case 29 from being lowered in the cold district. The water supply port 72 of the urea water tank 71 can be arranged at a portion where the operator gets on and off in the operation cabin 57 in a close contact manner, it is possible to easily execute a water supply work for supplying the urea water solution to the urea water tank 71 at the place where the operator gets on and off, and it is possible to improve a supply workability of the urea water solution for the exhaust gas purification.

As shown in FIGS. 1 to 12 and FIG. 17, in the engine device of the working vehicle having the first case 28 which removes the particulate matter in the exhaust gas of the diesel engine 1, and the second case 29 which removes the nitrogen oxides in the exhaust gas of the diesel engine 1, and connecting the second case 29 to the first case 28 via the urea mixing pipe 39, the engine device is provided with a plurality of case fixing bodies 95 and 96 which firmly fix the first case 28 and the second case 29, and the support frame body 98 which firmly fixes a plurality of case fixing bodies 95 and 96, the case fixing bodies 95 and 96 and the support frame body 98 are connected so that the attachment angle (the attachment position) can be adjusted, and the attitude of the exhaust gas inlet portion 34 of the first case 28 is adapted to be adjustable in relation to the attachment surface of the diesel engine 1. As a result, it is possible to easily join the connection surface of the DPF inlet pipe 34 serving as the exhaust gas inlet portion of the first case 28 to the exhaust gas outlet surface 7a of the diesel engine 1 by adjusting the attachment angle (the attachment position) between the case fixing bodies 95 and 96 and the support frame body 98, when the first case 28 and the second case 29 are united and assembled in the diesel engine 1. It is possible to simplify a work for determining the attachment positions of the first case 28 and the second case 29. More specifically, it is possible to improve the attachment and detachment workability of the first case 28 and the second case 29, and it is possible to simplify the assembling work or the maintenance work of the diesel engine 1.

As shown in FIGS. 1 to 12, the exhaust gas purification device 27 serving as the exhaust gas purification unit is formed by the cases 28 and 29, the case fixing bodies 95 and 96, and the support frame body 98, the lower end sides of a plurality of support leg bodies 82, 84, and 86 are firmly fixed to the outer surfaces of the cylinder head 2 of the diesel engine 1, and the support frame body 98 is connected to the upper end sides of a plurality of support leg bodies 82, 84, and 86. Therefore, it is possible to easily execute the maintenance work in the upper surface side of the diesel engine 1 by attaching and detaching the exhaust gas purification device 27. It is possible to easily reduce the interference with the attached parts of the diesel engine 1 while it is possible to firmly connect the support frame body 98 to the cylinder head 2 via a plurality of support leg bodies 82, 84, and 86, and it is possible to support the exhaust gas purification device 27 to the upper surface side of the diesel engine 1 with a high rigidity.

As shown in FIGS. 1 to 12, the support base 87 is arranged approximately horizontally in the upper surface side of the diesel engine 1 via a plurality of support leg bodies 82, 84, and 86, and the support frame body 98 is firmly fixed to the upper surface side of the support base 87. Therefore, it is possible to easily detach the first case 28 and the second case 29 from the diesel engine 1 in the maintenance work or the repair work of the diesel engine 1, and it is possible to simplify the maintenance work in the upper surface side of the diesel engine 1.

As shown in FIGS. 1 to 12 and FIG. 15, the support base 87 is adapted to be fixed to the diesel engine 1 in a horizontal attitude on the basis of the exhaust gas outlet surface 7a of the diesel engine 1, by bringing a part of the lower surface side of the support base 87 into surface contact with a part of the exhaust gas outlet surface 7a of the diesel engine 1. Therefore, it is possible to construct the support base 87 having the high rigidity structure with a low cost according to a sheet metal processing, it is possible to easily simplify the positioning work when the support frame body 98 is assembled in the upper surface side of the support base 87, and it is possible to easily connect the support base 87 to the diesel engine 1 in a predetermined support attitude.

Next, the differential pressure sensor 111 is provided for detecting difference between an exhaust gas pressure in an exhaust gas intake side (an upstream side) of the soot filter 31, and an exhaust gas pressure in an exhaust gas discharge side (a downstream side) thereof, in the first case 28 as shown in FIGS. 1, 2, and 5. One end side of the sensor bracket 112 is fastened by bolts to the SCR inlet side flange body 40, the other end side of the sensor bracket 112 is protruded toward the upper surface side of the first case 28 from the SCR inlet side flange body 40, and the differential pressure sensor 111 is firmly fixed to the other end side of the sensor bracket 112. The differential pressure sensor 111 is arranged in the upper lateral side of the first case 28 via the sensor bracket 112. An upstream side sensor piping 113 and a downstream side sensor piping 114 made of synthetic resin are connected their one end sides to the differential pressure sensor 111. The upstream side and downstream side sensor pipings 113 and 114 are connected their other end sides respectively to the upstream side and the downstream side of the soot filter 31 in the first case 28.

Further, an upstream side gas temperature sensor 115 is provided for detecting the exhaust gas temperature in the exhaust gas intake side of the diesel oxidation catalyst 30, and a downstream side gas temperature sensor 116 is provided for detecting the exhaust gas temperature in the exhaust gas discharge side of the diesel oxidation catalyst 30. The difference between the exhaust gas pressure in the inflow side of the soot filter 31 and the exhaust gas pressure in the outflow side of the soot filter 31 (the differential pressure of the exhaust gas) is detected by the differential pressure sensor 111, and the exhaust gas temperature of the diesel oxidation catalyst 30 portion in the exhaust gas intake side of the soot filter 31 is detected by the temperature sensors 115 and 116. More specifically, since the residual volume of the particulate matter in the exhaust gas collected by the soot filter 31 is in proportion to the differential pressure of the exhaust gas, a soot filter regeneration control is executed on the basis of results of detection of the differential pressure sensor 111 when an amount of the particulate matters remaining in the soot filter 31 is increased more than a predetermined amount, the soot filter regeneration control reducing the amount of the particulate matters in the soot filter 31 (for example, a fuel injection control or an intake air control of the diesel engine 1 for raising the temperature of the exhaust gas).

Figure 18:
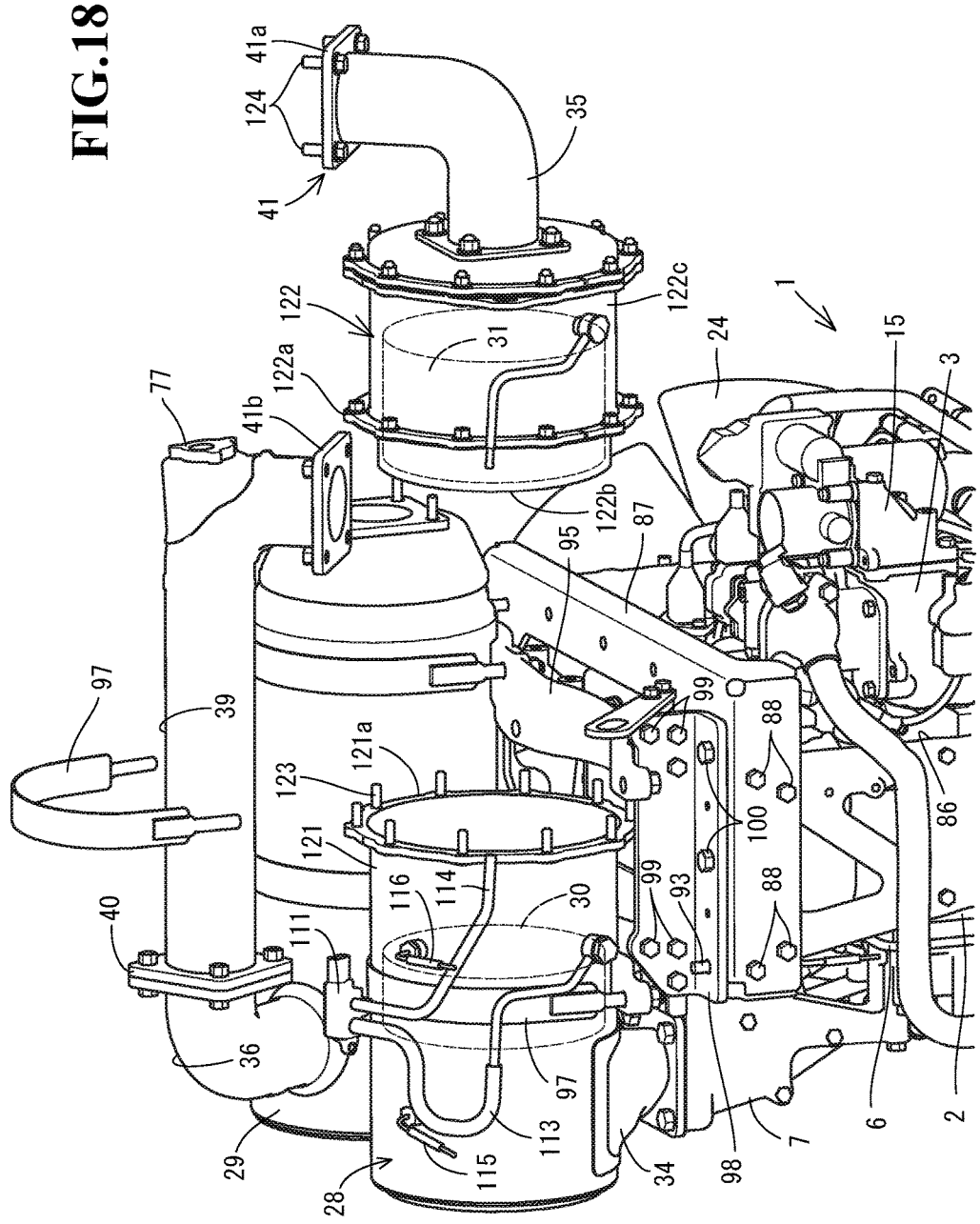
FIG. 18 is a back elevational perspective view in a state in which a first case is partly exploded.
Figure 19:
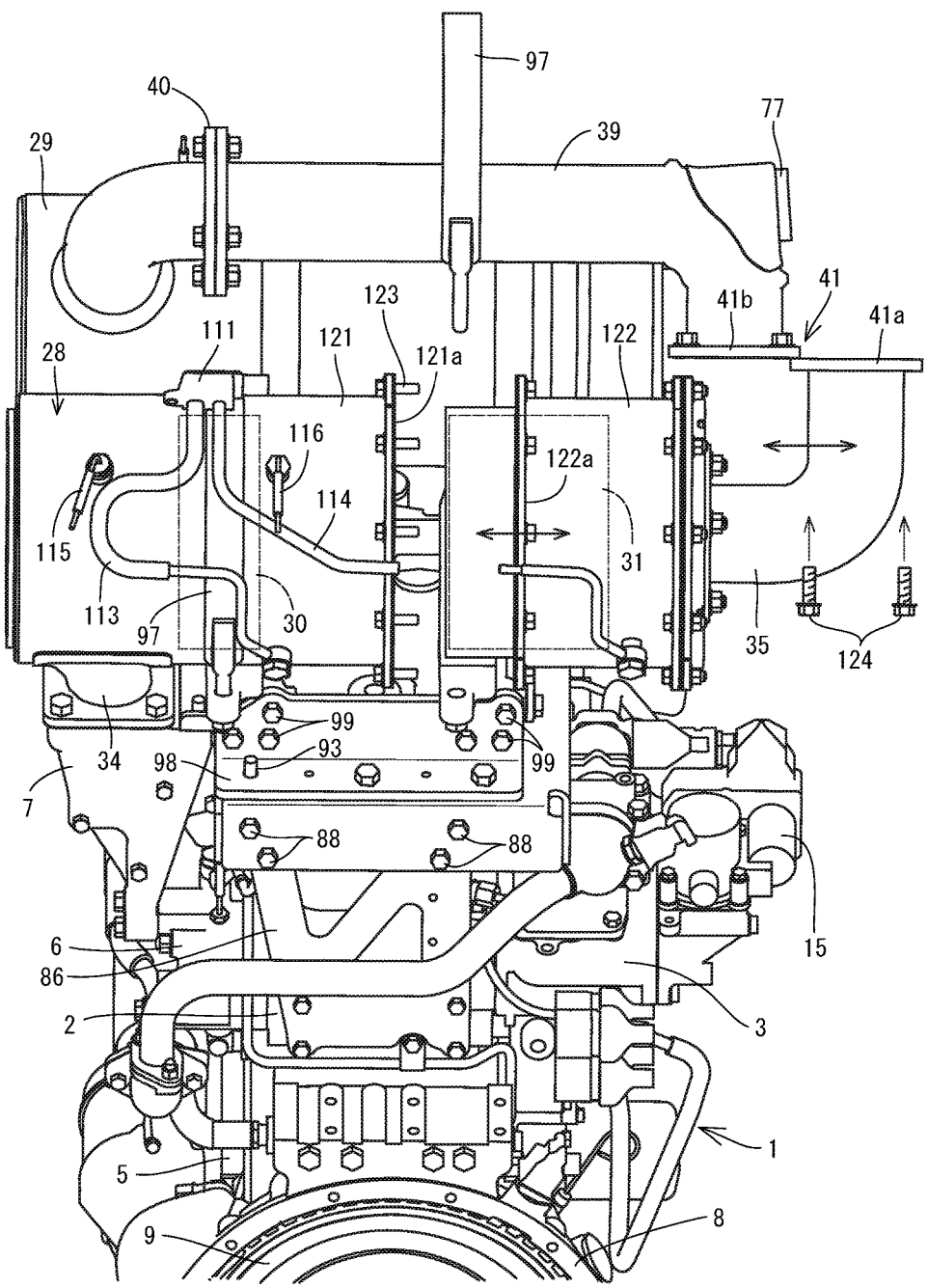
FIG. 19 is an attachment and detachment explanatory view in a state in which the first case is partly exploded.

Next, a description will be given of the assembly and disassembly structure of the first case 28 with reference to FIGS. 18 and 19. As shown in FIGS. 18 and 19, the first case 28 is formed by an exhaust gas intake side case 121 which is provided with the DPF inlet pipe 34, and an exhaust gas discharge side case 122 which is provided with the DPF outlet pipe 35. The oxidation catalyst 30 is inwardly provided in the exhaust gas intake side case 121, the soot filter 31 is inwardly provided in an inner tube 122*b* of the exhaust gas discharge side case 122, an exhaust gas intake side of the inner tube 122*b* is inwardly provided in an outer tube 122*c* of the exhaust gas discharge side case 122, and an exhaust gas discharge side of the inner tube 122*b* is adapted to be protruded out of the outer tube 122*c*.

Further, the exhaust gas discharge side of the inner tube 122*b* is inserted into the exhaust gas intake side case 121 so as to be freely taken in and out, a case flange body 121*a* of the exhaust gas intake side case 121 is fastened by bolts 123 to a case flange body 122*a* of the outer tube 122*c* so as to be separable, and the exhaust gas intake side case 121 and the exhaust gas discharge side case 122 are detachably connected. Meanwhile, the DPF outlet pipe 35 serving as the exhaust gas outlet pipe is provided in the exhaust gas discharge side case 122 (the outer tube 122*c*), and the exhaust gas outlet side of the DPF outlet pipe 35 is extended in a radial direction (a direction which is orthogonal to the cylinder axis of the first case 28) which intersects the exhaust gas moving direction of the first case 28. Further, the DPF outlet side flange body 41 for connecting the urea mixing pipe 39 and the DPF outlet pipe 35 is formed by an outlet pipe flange 41*a* in the exhaust gas outlet side end portion of the DPF outlet pipe 35, and a mixing pipe flange 41*b* in the exhaust gas inlet side end portion of the urea mixing pipe 39, and the outlet pipe flange 41*a* is positioned in an outer lateral side of a cylindrical outer peripheral surface of the exhaust gas discharge side case 122 (the outer tube 122*c*).

More specifically, the DPF outlet pipe 35 is extended to the outer side in the direction which intersects the exhaust gas moving direction in the outer side of the exhaust gas discharge side case 122, and the connection portion (the DPF outlet side flange body 41) between the urea mixing pipe 39 and the DPF outlet pipe 35 is arranged at a position which is deflected from the separation track of the exhaust gas discharge side case 122 which is separated in the exhaust gas moving direction. The DPF outlet pipe 35, the urea mixing pipe 39, and the SCR inlet pipe 36 are adapted to be integrally fixed by connecting one end side of the urea mixing pipe 39 to the DPF outlet pipe 35 with fastening the mixing pipe flange 41*b* by bolts 124 to the outlet pipe flange 41*a*, and connecting the other end side of the urea mixing pipe 39 to the SCR inlet pipe 36 via the SCR inlet side flange body 40.

According to the structure mentioned above, in the case that the residual volume of the particulate matter of the soot filter 31 (a detected value of the differential pressure sensor 111) is increased more than a regeneration controllable range, the fastening between the case flange bodies 121*a* and 122*a* is released by detaching the bolts 123, and the exhaust gas discharge side case 122 can be separated from the exhaust gas intake side case 121 when releasing the fastening between the outlet pipe flange 41*a* and the mixing pipe flange 41*b*. The first case 28 is detachably disassembled by moving the exhaust gas discharge side case 122 from the exhaust gas intake side case 121 in the direction of the cylindrical axis of the first case 28 (the exhaust gas moving direction), and extracting the inner tube 122*b* from the exhaust gas intake side case 121. Next, the maintenance work of the first case 28 for artificially removing the particulate matter in the soot filter 31 is carried out by taking the soot filter 31 out of the inner tube 122*b*.

By the way, the exhaust gas intake side case 121 is supported to the exhaust gas outlet pipe 7 via the DPF inlet pipe 34 when the fastening between the case flange bodies 121*a* and 122*a* is released by disconnecting the bolts 123, and the urea mixing pipe 39 is supported to the second case 29 via the SCR inlet side flange body 40 when the fastening between the outlet pipe flange 41*a* and the mixing pipe flange 41*b* is released by disconnecting the bolts 124. Therefore, since only the exhaust gas discharge side case 122 is detached and it is not necessary to detach the exhaust gas intake side case 121 or the urea mixing pipe 39, in the maintenance (filter regeneration) work of the soot filter 31, it is possible to reduce a maintenance man-hour of the soot filter 31 in comparison with the structure in which it is necessary to disassemble the exhaust gas intake side case 121, the urea mixing pipe 39, or the like.

As shown in FIGS. 1 to 7, FIG. 18, and FIG. 19, in the engine device of the working vehicle having the first case 28 which removes the particulate matter in the exhaust gas of the engine 1, and the second case 29 which removes the nitrogen oxides in the exhaust gas of the engine 1, and connecting the second case 29 to the first case 28 via the urea mixing pipe, the first case 28 is separately formed in the exhaust gas intake side case 121 and the exhaust gas discharge side case 122, and the exhaust gas discharge side case 122 is structured to be separable in a state in which the exhaust gas intake side case 121 is supported to the engine 1 side. Therefore, in the maintenance work of the inner portion of the first case 28, it is not necessary to detach a whole of the first case 28, it is possible to easily reduce the number of the detachable parts necessary for the maintenance work of the inner portion of the exhaust gas discharge side case 122 (the first case), it is possible to easily detach the soot filter 31 and the like which is inwardly provided in the exhaust gas discharge side case 122, and it is possible to reduce a cleaning man-hour of the inner portion of the exhaust gas discharge side case 122 or the soot filter 31.

As shown in FIGS. 1 to 7, FIG. 18, and FIG. 19, the DPF outlet pipe 35 is provided as the exhaust gas outlet pipe which connects the urea mixing pipe 39 to the first case 28, the DPF outlet pipe 35 is extended to an outer side in the direction which intersects the exhaust gas moving direction in the outer side of the exhaust gas discharge side case 122, and the connection portion (the DPF outlet side flange body 41) between the urea mixing pipe 39 and the DPF outlet pipe 35 is arranged at a position which is deflected from the separation track of the exhaust gas discharge side case 122 separated in the exhaust gas moving direction. Therefore, the exhaust gas discharge side case 122 can be easily slid and disconnected in the exhaust gas moving direction of the first case 28 by disconnecting the fastening bolts in the connection portion between the urea mixing pipe 39 and the DPF outlet pipe 35, and releasing the connection between the exhaust gas intake side case 121 and the exhaust gas discharge side case 122.

As shown in FIGS. 1 to 7, FIG. 18, and FIG. 19, the exhaust gas purification device 27 serving as the exhaust gas purification unit is adapted to be formed by disposing the case fixing bodies 95 and 96 and the fastening bands 97 as the pinching body which firmly fixes the exhaust gas intake side case 121 and the second case 29, disposing the case fixing bodies 95 and 96 and the fastening bands 97 as the pinching body which firmly fixes the exhaust gas discharge side case 122 and the second case 29, and firmly and integrally fixing the first case 28 and the second case 29 by the case fixing bodies 95 and 96 and the fastening bands 97. Therefore, it is possible to easily attach and detach the exhaust gas discharge side case 122 by disconnecting the fastening bands 97 which firmly fix the exhaust gas discharge side case 122 and the second case 29. It is not necessary to carry out the attaching and detaching work of the fastening bands 97 which firmly fix the exhaust gas intake case 121 and the second case 29 when maintaining the inner portion of the exhaust gas discharge side case 122, and it is possible to improve a workability of maintaining the inner portion of the exhaust gas discharge side case 122 (cleaning the soot filter).

As shown in FIG. 1 and FIGS. 9 to 12, the support base 87 is adapted to be connected to the exhaust manifold 6 of the diesel engine 1 and a plurality of support leg bodies 82, 84, and 86 by disposing the case fixing bodies 95 and 96 and the fastening bands 97 which firmly and integrally fix the first case 28 and the second case 29, and the support base 87 which attaches the case fixing bodies 95 and 96, and arranging a plurality of support leg bodies 82, 84, and 86 in a rising manner in the upper surface side of the diesel engine 1. Therefore, it is possible to absorb a working error or the like of the attachment part such as the support base 87 and the like by adjusting the connection portions between the support leg bodies 82, 84, and 86 and the support base 87, it is possible to easily compensate the angle of incline for the attachment of the support base 87, it is possible to easily support the first case 28 and the second case 29 in a predetermined attitude, and it is possible to support the support base 87 so as to be separated from the attached parts of the diesel engine 1, thereby preventing the mutual interference. It is possible to easily improve the assembly workability for assembling the first case 28 and the second case 29 in the diesel engine 1.

Figure 20:
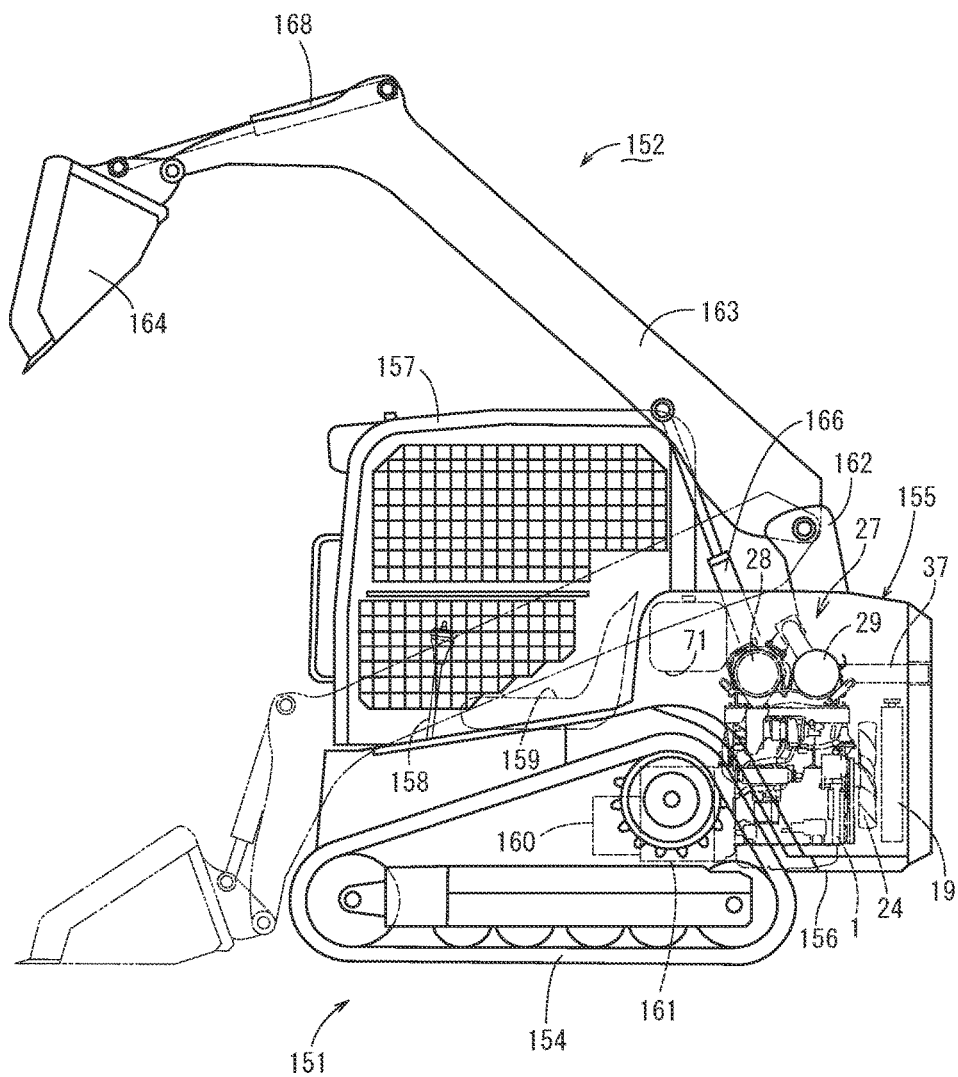
FIG. 20 is a side elevational view of a working vehicle which mounts a diesel engine thereon.
Figure 21:
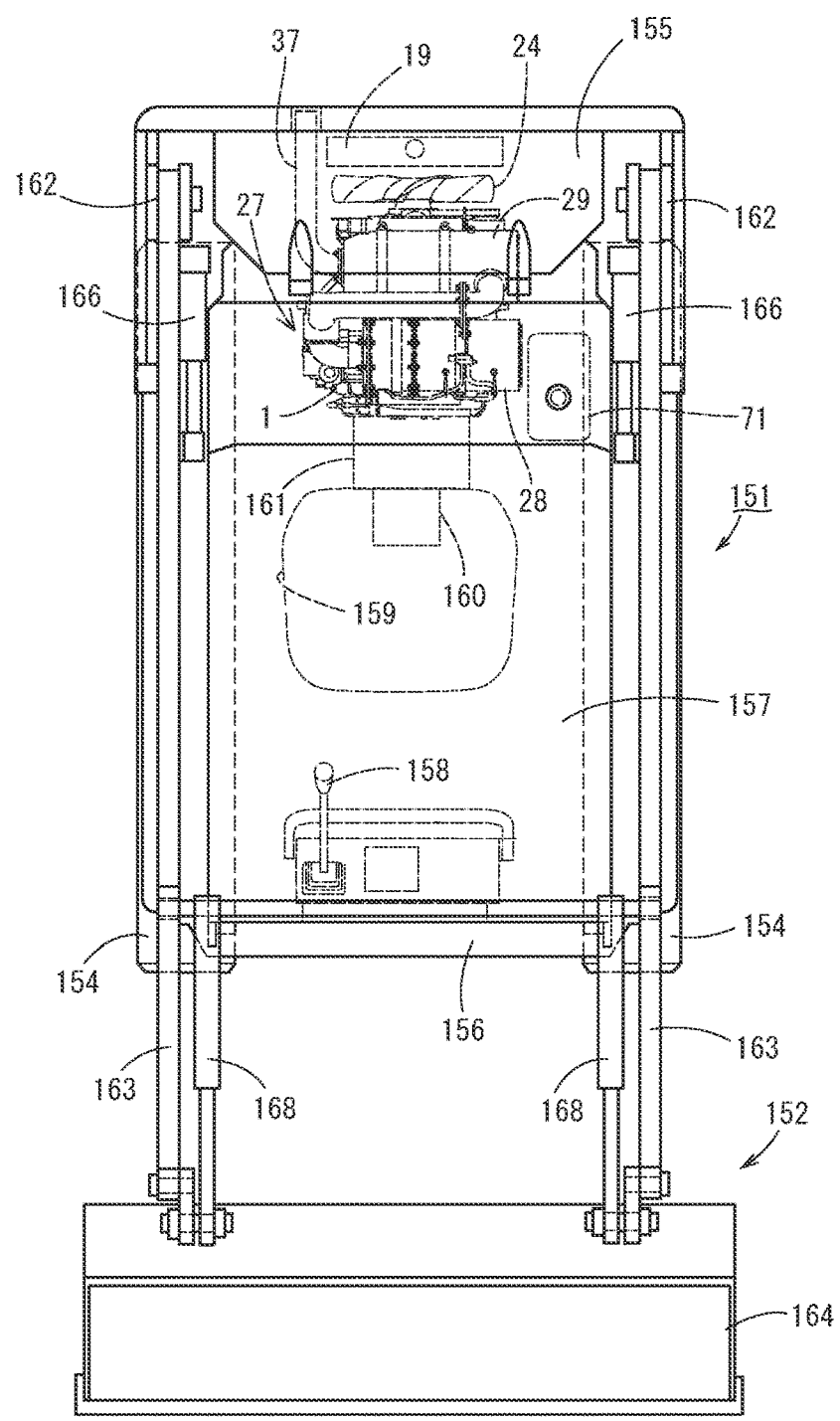
FIG. 21 is a plan view of the working vehicle.

Next, a description will be given of a skid steer loader 151 which mounts the diesel engine 1 thereon, with reference to FIGS. 20 and 21. The skid steer loader 151 shown in FIGS. 20 and 21 and serving as the working vehicle installs a loader device 152 mentioned later thereto and is adapted to carry out a loading work. Right and left travel crawler portions 154 are installed to the skid steer loader 151. Further, an openable hood 155 is arranged above the travel crawler portions 154 of the skid steer loader 151. The diesel engine 1 is accommodated within the hood 155. The first case 28 and the second case 29 are mounted on and fixed to the upper surface portion of the diesel engine 1.

The diesel engine 1 is supported to a travel machine body 156 provided in the skid steer loader 151 via a vibration isolation member or the like. A cabin 157 for a driver to get on is arranged in front of the hood 155, and a control steering wheel 158, a driver seat 159, and the like are provided in an inner portion of the cabin 157. Further, there are provided a loading work hydraulic pump device 160 which is driven by the diesel engine 1, and a travel transmission device 161 which drives the right and left travel crawler portion 154. The power from the diesel engine 1 is transmitted to the right and left travel crawler portions 154 via the travel transmission device 161. An operator seating on the driver seat 159 can carry out a traveling operation and the like of the skid steer loader 151 via a control portion such as the control steering wheel 158.

Further, the loader device 152 has loader posts 162 which are arranged both right and left sides of the travel machine body 156, a pair of right and left lift arms 163 which are connected to upper ends of the loader posts 162 so as to be freely oscillated up and down, and a bucket 164 which is connected to leading end portions of the right and left lift arms 163 so as to be freely oscillated up and down.

Lift cylinders 166 for oscillating up and down the lift arms 163 are respectively provided between the loader post 162 and the corresponding lift arms 163. Bucket cylinders 168 for oscillating up and down the bucket 164 are provided between the right and left lift arms 163 and the bucket 164. In this case, a hydraulic force of the loading work hydraulic pump device 160 is controlled according to an operation of a loader lever (not shown) by the operator on the control seat 159, the lift cylinders 166 and the bucket cylinders 168 are actuated to be expanded and contracted to oscillate up and down the lift arms 163 and the bucket 164, and the loading work is adapted to be executed. The urea water tank 71 is inwardly provided in a front side upper portion of the hood 155. Further, the radiator 19 arranged so as to be opposed to the cooling fan 24 is inwardly provided in a rear portion of the hood 155.

Figure 22:
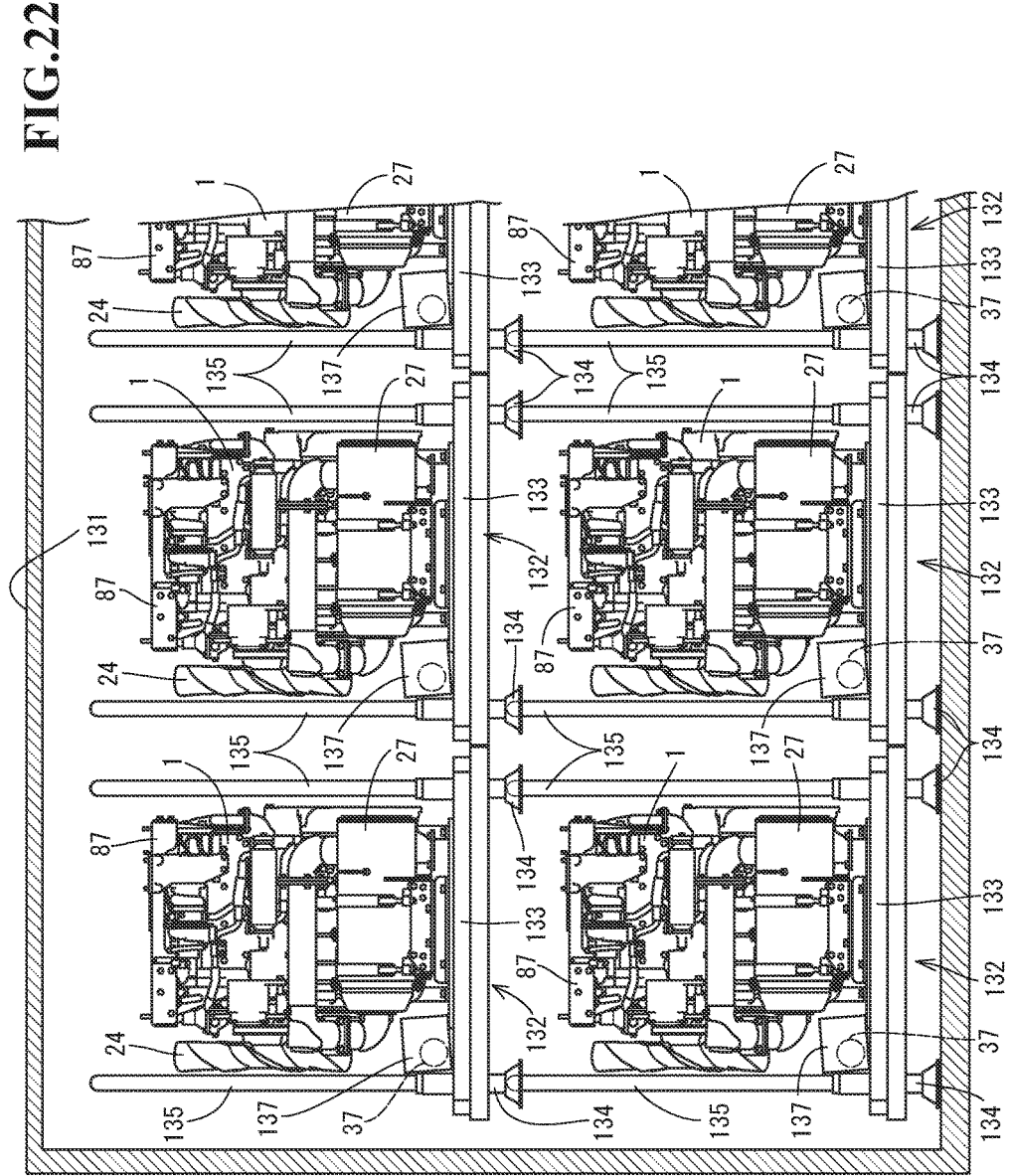
FIG. 22 is a side elevational explanatory view showing a mounted state of a transport container.
Figure 23:
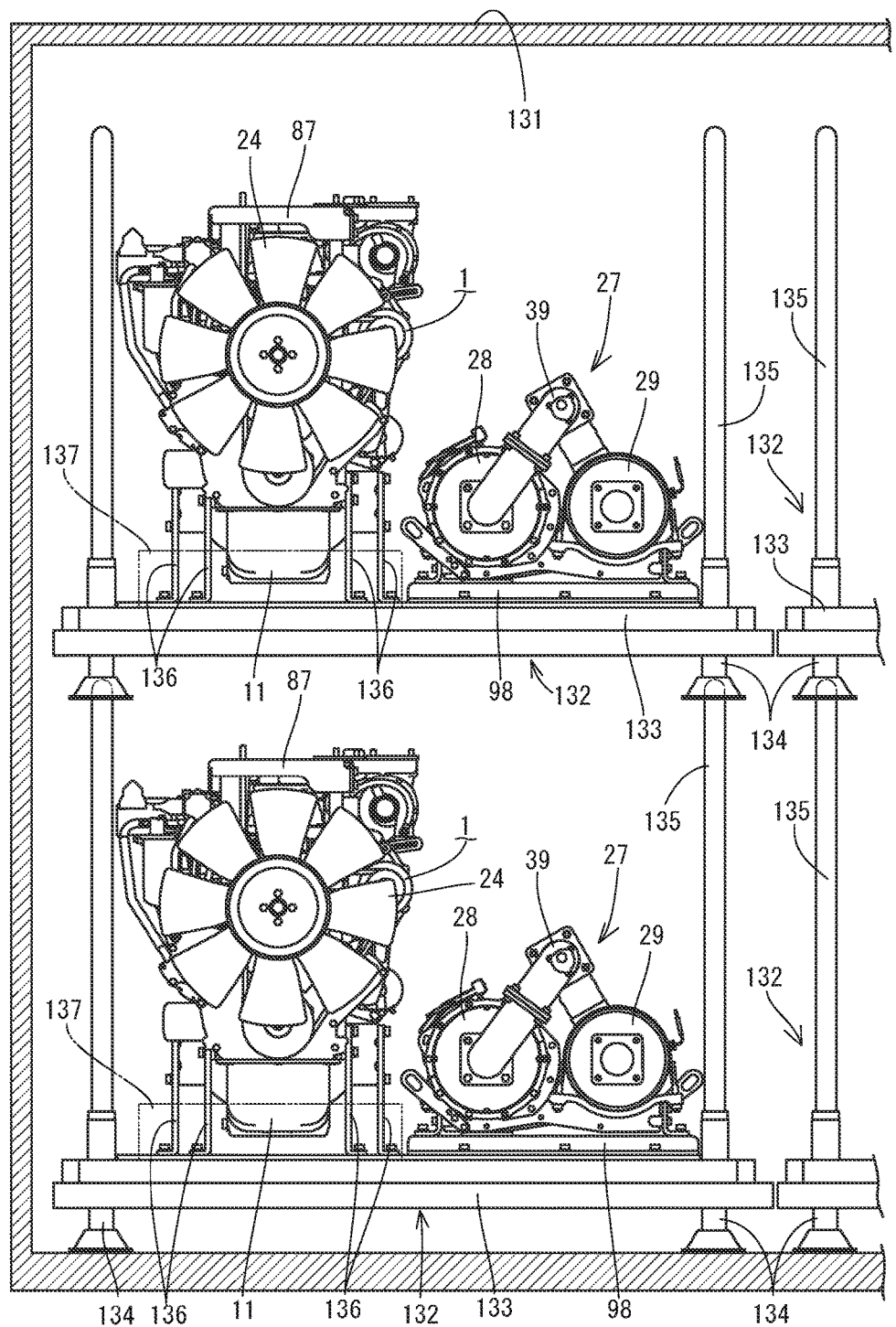
FIG. 23 is a front elevational explanatory view of the same.

Next, a description will be given of a conveying work of the exhaust gas purification device 27 while utilizing a quadrangular box shaped transport container 131 which is loaded on a container transport truck or a container ship, as shown in FIGS. 22 and 23. Packing bases 132 mounted in a two-stage piled manner are provided in an inner portion of the transport container 131. The packing base 132 is constructed as a pallet structure which can be conveyed by a forklift, is constructed by a pallet main body 133 which has a flat surface, four leg bodies 134 which support the pallet main body 133, and four support post bodies 135 which are provided in a rising manner on upper surface of the pallet main body 133, and is adapted to be piled up in a multiple stages by detachably fitting and attaching downward concave portions in lower surfaces of the leg bodies 134 to upper ends of the support post bodies 135 from above.

An outside dimension (a vertical or longitudinal or lateral width) of the packing base 132 is formed in conformity to an internal volume (a vertical or longitudinal or lateral width) of the transport container 131, and the packing base 132 is adapted to be capable of being loaded to the inner portion of the transport container 131 so that any empty space is not formed in the inner portion of the transport container 131, for example, by arranging the packing bases 132 in the transport container 131 in a multiple lines in lateral and longitudinal directions under a vertically two-stage piled state.

Figure 11:
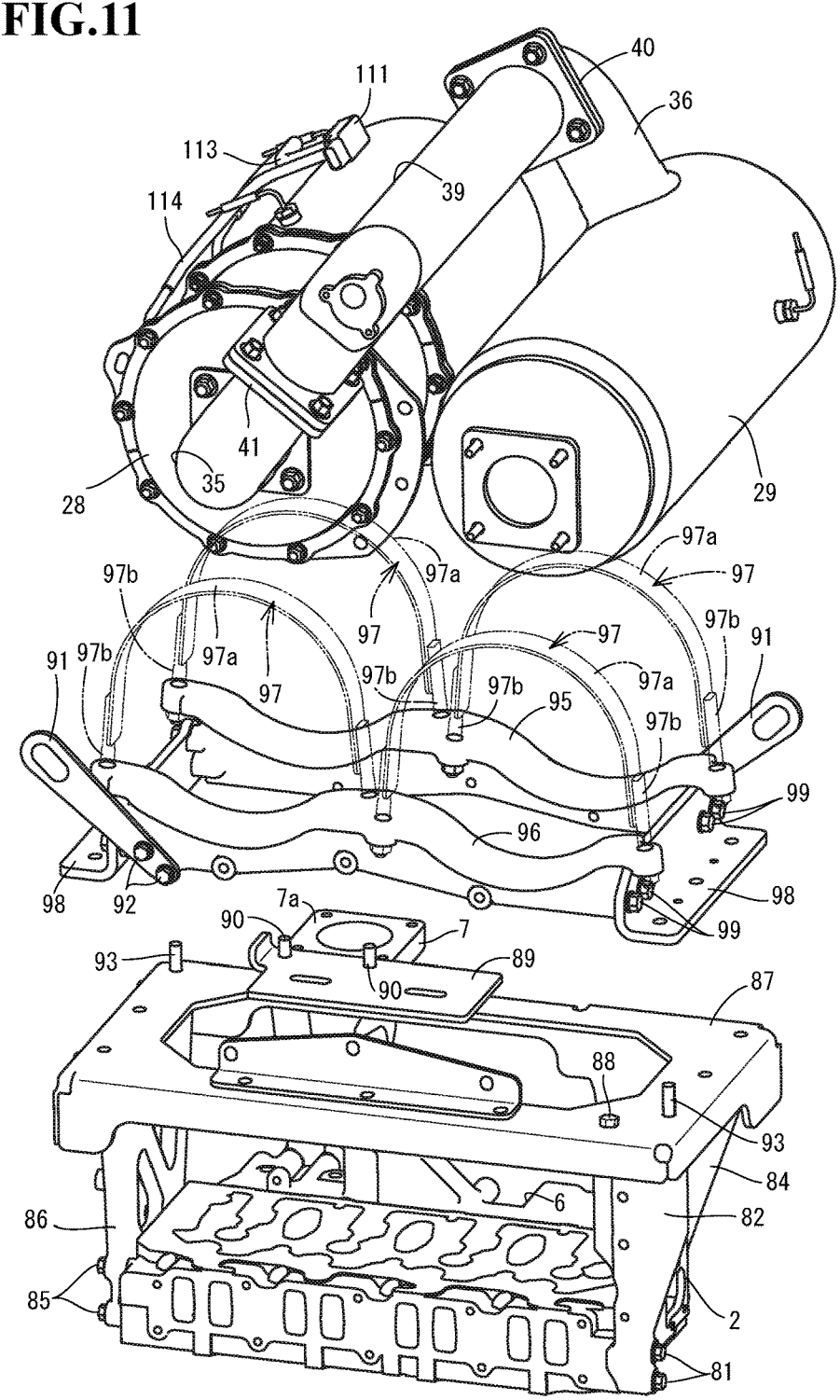
FIG. 11 is a right side elevational perspective exploded view of the same.
Figure 12:
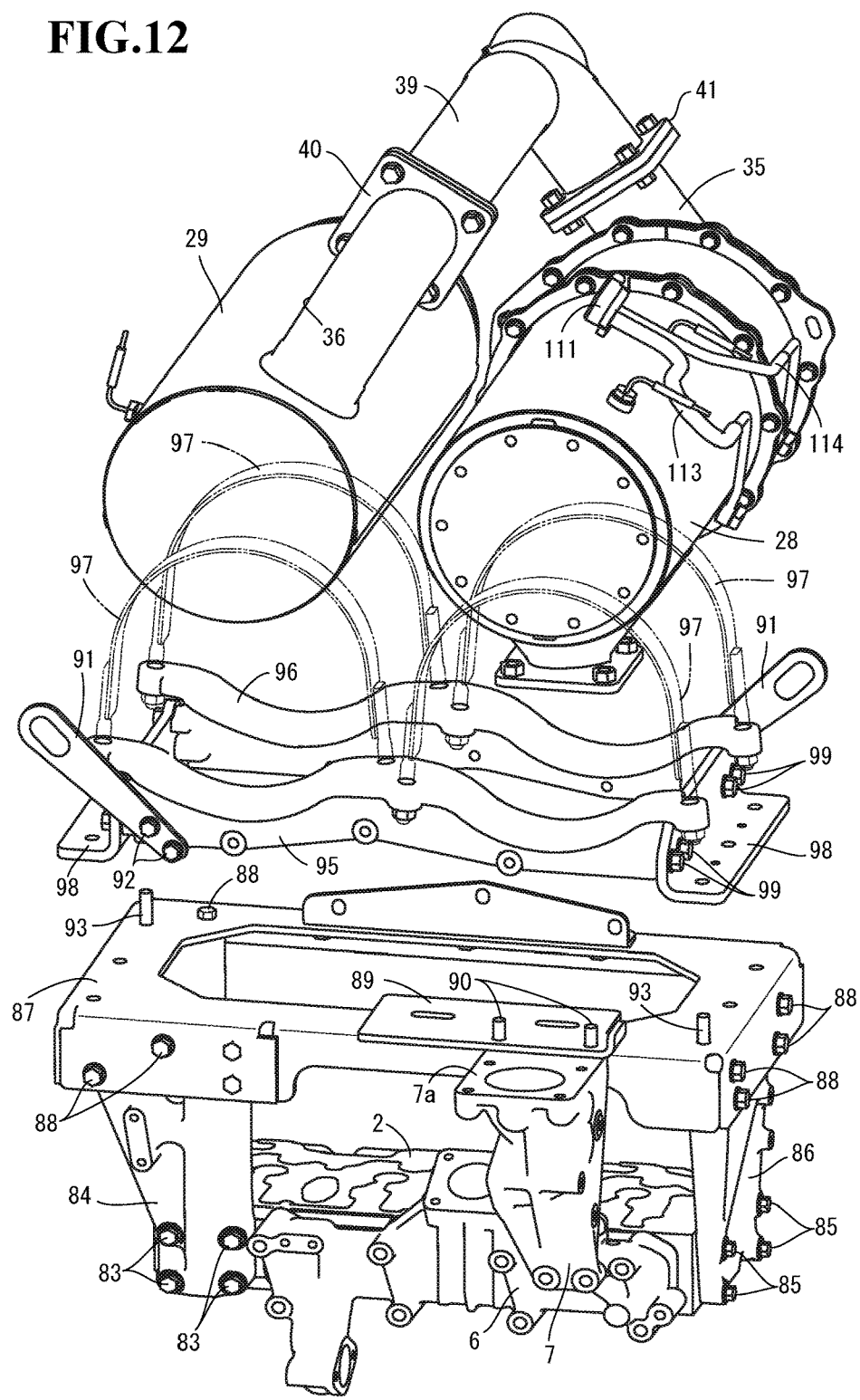
FIG. 12 is a left side elevational perspective exploded view of the same.

As shown in FIGS. 22 and 23, lower ends of mounting bed frame bodies 136 are detachably fastened by bolts to the upper surface of the pallet main body 133 by firmly fixing upper end sides of a plurality of mounting bed frame bodies 136 to the engine leg attachment portion of the diesel engine 1 after the assembly of the diesel engine 1 is finished, and extending downward lower end sides of the mounting bed frame bodies 136 from the diesel engine 1, in a state in which the support base 87 is firmly fixed to the upper surface side (the outer peripheral side) of the diesel engine 1 via the support leg bodies 82, 84, and 86 as a part of the diesel engine 1 previously during the assembly process of the diesel engine 1 (refer to FIG. 11 and the like). Meanwhile, the support frame body 98 of the exhaust gas purification device 27 is detachably fastened by bolts to the upper surface which is adjacent to the diesel engine 1, in the upper surface of the pallet main body 133, in a state in which the first case 28 and the second case 29 connected to the urea mixing pipe 39 are firmly fixed previously to the support frame body 98 via the case fixing bodies 95 and 96 and the fastening bands 97, and the exhaust gas purification device 27 is unitized (refer to FIG. 9 and the like).

More specifically, the diesel engine 1 and the exhaust gas purification device 27 are mounted adjacently to the upper surface of the same pallet main body 133, the after-attached part such as the SCR outlet pipe 37 serving as the exhaust pipe or the assembling bolt is inwardly installed to a carton case 137, and the carton case 137 is fixed to the empty space in the upper surface of the pallet main body 133 by a packaging tape. A lot of packing bases 132 are adapted to be loadable in the inner portion of the transport container 131 by mounting one set of the diesel engine 1, the exhaust gas purification device 27, and the assembly accessories (the carton case 137) to the same packing base 132, and supporting the diesel engine 1 and the exhaust gas purification device 27 to the same packing base 132 in a transportable manner in a state of being separated.

As shown in FIGS. 1 to 5, FIGS. 13 and 14, and FIGS. 20 to 23, in the engine device having the first case 28 which removes the particulate matter in the exhaust gas of the diesel engine 1, and the second case 29 which removes the nitrogen oxides in the exhaust gas of the diesel engine 1, and connecting the second case 29 to the first case 28 via the urea mixing pipe 39, the exhaust gas purification device 27 serving as the exhaust gas purification unit is formed by firmly and integrally fixing the first case 28 and the second case 29 by the support frame body 98, and the diesel engine 1 and the exhaust gas purification device 27 are adapted to be supported in the transportable manner in the state of being separated. Therefore, the exhaust gas purification device 27 can be easily combined with the diesel engine 1 according to a bolt fastening work when mounting to the working vehicle (the agricultural machine such as the tractor 51, the construction machine such as the skid steer loader 151, or the like). The exhaust gas purification device 27 can be easily assembled in the diesel engine 1 in the place where the diesel engine 1 is mounted, while the diesel engine 1 and the exhaust gas purification device 27 can be packed with a low height, and the transport cost can be reduced by improving the mounting property to the transport container 131, and it is possible to reduce the assembling man-hour (the assembling cost) in the assembling plant for the working vehicle (the tractor 51, the skid steer loader 151, or the like).

As shown in FIGS. 1 to 5 and FIGS. 20 to 23, the support base 87 is provided for detachably fastening the support frame body 98 by the bolts 100, the support base 87 is firmly fixed to the outer peripheral side of the diesel engine 1 as a part of the diesel engine 1 during the assembly process of the diesel engine 1, and the exhaust gas purification device 27 is adapted to be attached to and detached from the diesel engine 1 via the support base 87. Therefore, the exhaust gas purification device 27 can be supported to the diesel engine 1 in an appropriate attitude according to a simple assembling work for connecting the support frame body 98 to the support base 87. In the assembling plant for the working vehicle or the like mounting the diesel engine 1 thereon, it is possible to reduce the assembling man-hour of the exhaust gas purification device 27, and it is possible to improve the assembly workability of the diesel engine 1 and the exhaust gas purification device 27 by reducing the assembly error of the exhaust gas purification device 27.

As shown in FIGS. 20 to 23, one set of the diesel engine 1, the exhaust gas purification device 27, and the assembly accessories are mounted to the same packing base 132, and the packing base 132 is adapted to be loadable to the transport container 131. Therefore, the diesel engine 1 can be packed with a low overall height, it is possible to improve the mounting property to the transport container 131, and it is possible to reduce the transport cost, while the diesel engine 1, the exhaust gas purification device 27, and the assembly accessories can be collectively transported as one set of assembling materials.

Figure 24:
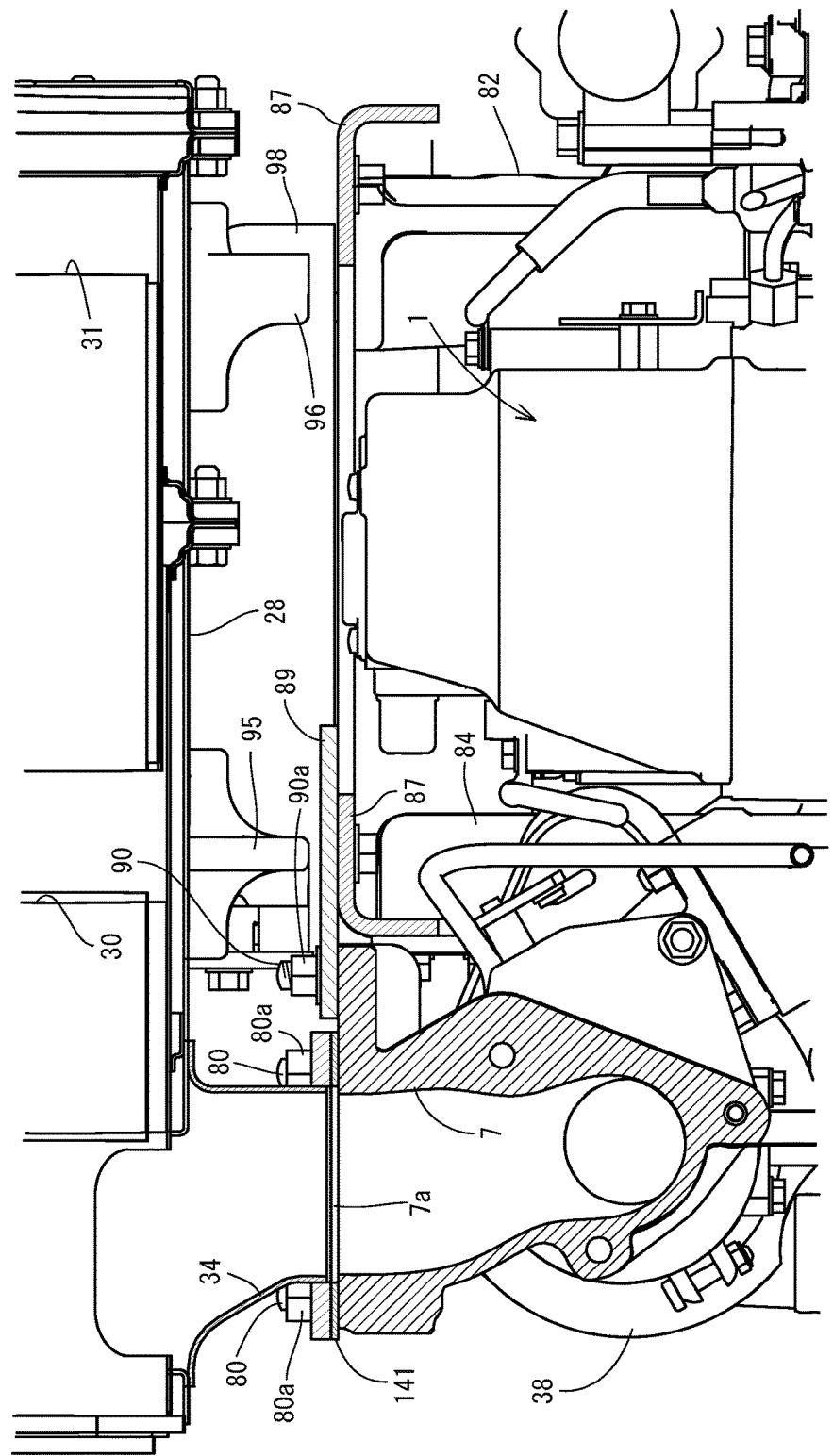
FIG. 24 is a cross sectional explanatory view of an exhaust gas outlet pipe portion.

Next, a description will be given of the connection structure between the diesel engine 1 and the exhaust gas purification device 27 (the first case 28) with reference to FIGS. 1 to 5, and FIGS. 15, 24, and 25. FIG. 24 shows an example of the connection structure between the diesel engine 1 and the exhaust gas purification device 27 (the first case 28). As shown in FIGS. 1 to 5 and FIG. 24, the tabular positioning body 89 is fixed by welding to the upper surface of the support base 87 which is provided so as to face to the exhaust gas outlet pipe 7 in the upper surface of the support base 87. A tabular lower surface of the positioning body 89 is brought into contact with the flat exhaust gas outlet surface 7a of the exhaust gas outlet pipe 7 which is open upward, from the above side. Apart of the tabular lower surface of the positioning body 89 is directly brought into surface contact with a part of the flat exhaust gas outlet surface 7a. The positioning body 89 is fastened to the exhaust gas outlet pipe 7 by the positioning bolt 90 and a nut 90a.

More specifically, the support base 87 is firmly fixed to the exhaust gas outlet pipe 7 via the positioning bolt 90 and the positioning nut 90a which are implanted on the upper surface side (the exhaust gas outlet surface 7a) of the exhaust gas outlet pipe 7 of the diesel engine 1 so as to be detachable from a direction of the upper surface. The upper surface of the support base 87 is adapted to be approximately horizontal to the diesel engine 1 on the basis of the surface contact between the exhaust gas outlet pipe 7 and the positioning body 89. The attachment position (the support attitude) of the support base 87 is determined on the basis of the flat exhaust gas outlet surface 7a of the exhaust gas outlet pipe 7, and the positioning body 89 corresponding to a part of the support base 87 is adapted to be brought into surface contact with the exhaust gas outlet surface 7a of the diesel engine 1.

In addition, the DPF inlet pipe 34 is extended downward from the lower surface side of the first case 28. An inlet flange body 34a brought into contact with the exhaust gas outlet surface 7a is firmly and integrally fixed to a downward opening portion of the DPF inlet pipe 34 connected to the exhaust gas outlet pipe 7, and the inlet flange body 34a corresponding to the exhaust gas inlet surface of the first case 28 is joined to the exhaust gas outlet surface 7a of the diesel engine 1. The lower surface of the inlet flange body 34a is brought into contact with the upper surface of the flat exhaust gas outlet surface 7a of the exhaust gas outlet pipe 7 via a small size gasket 141 for preventing gas leakage. The inlet flange body 34a is detachably fastened to the exhaust gas outlet pipe 7 by bolts 80 and nuts 80a implanted on the exhaust gas outlet surface 7a. More specifically, the DPF inlet pipe 34 (the inlet flange body 34a) is firmly fixed to the exhaust gas outlet pipe 7 via the small size gasket 141 by pinching the small size gasket 141 between the exhaust gas outlet surface 7a of the diesel engine 1 and the exhaust gas inlet surface (the inlet flange body 34a) of the first case 28 as well as directly bringing the support base 87 into surface contact with the exhaust gas outlet surface 7a of the diesel engine 1.

As shown in FIGS. 1 to 5, and FIGS. 24 and 25, in the engine device having the first case 28 which removes the particulate matter in the exhaust gas of the diesel engine 1, and the second case 29 which removes the nitrogen oxides in the exhaust gas of the diesel engine 1, and connecting the second case 29 to the first case 28 via the urea mixing pipe 39, the inlet flange body 34a corresponding to the exhaust gas inlet surface of the first case 28 is joined to the exhaust gas outlet surface 7a of the diesel engine 1, the support base 87 firmly fixed to the diesel engine 1 is provided, and a part of the support base 87 is adapted to be brought into surface contact with the exhaust gas outlet surface 7a of the engine 1. Therefore, it is possible to easily secure the attachment strength by constructing the support base 87 as the sheet metal structure having a high rigidity, while the attachment position of the support base 87 can be easily determined by the connection between the exhaust gas outlet surface 7a (the exhaust gas outlet pipe 7) of the diesel engine 1 and the support base 87. For example, it is possible to improve an assembly workability of the support base 87 in which the attachment attitude of the support base 87 is horizontal to the diesel engine 1.

As shown in FIGS. 1 to 5 and FIG. 24, the support base 87 is directly brought into surface contact with the exhaust gas outlet surface 7a (the exhaust gas outlet pipe 7) of the diesel engine 1, and the small size gasket 141 is pinched between the exhaust gas outlet surface 7a of the diesel engine 1 and the exhaust gas inlet surface (the inlet flange body 34a) of the first case 28. Therefore, it is possible to determine the attachment attitude of the support base 87 on the basis of the surface contact between the exhaust gas outlet surface 7a of the diesel engine 1 and the support base 87, it is possible to improve the attachment workability of the support base 87 in relation to the diesel engine 1, and it is possible to form the small size gasket 141 with a small area.

Figure 25:
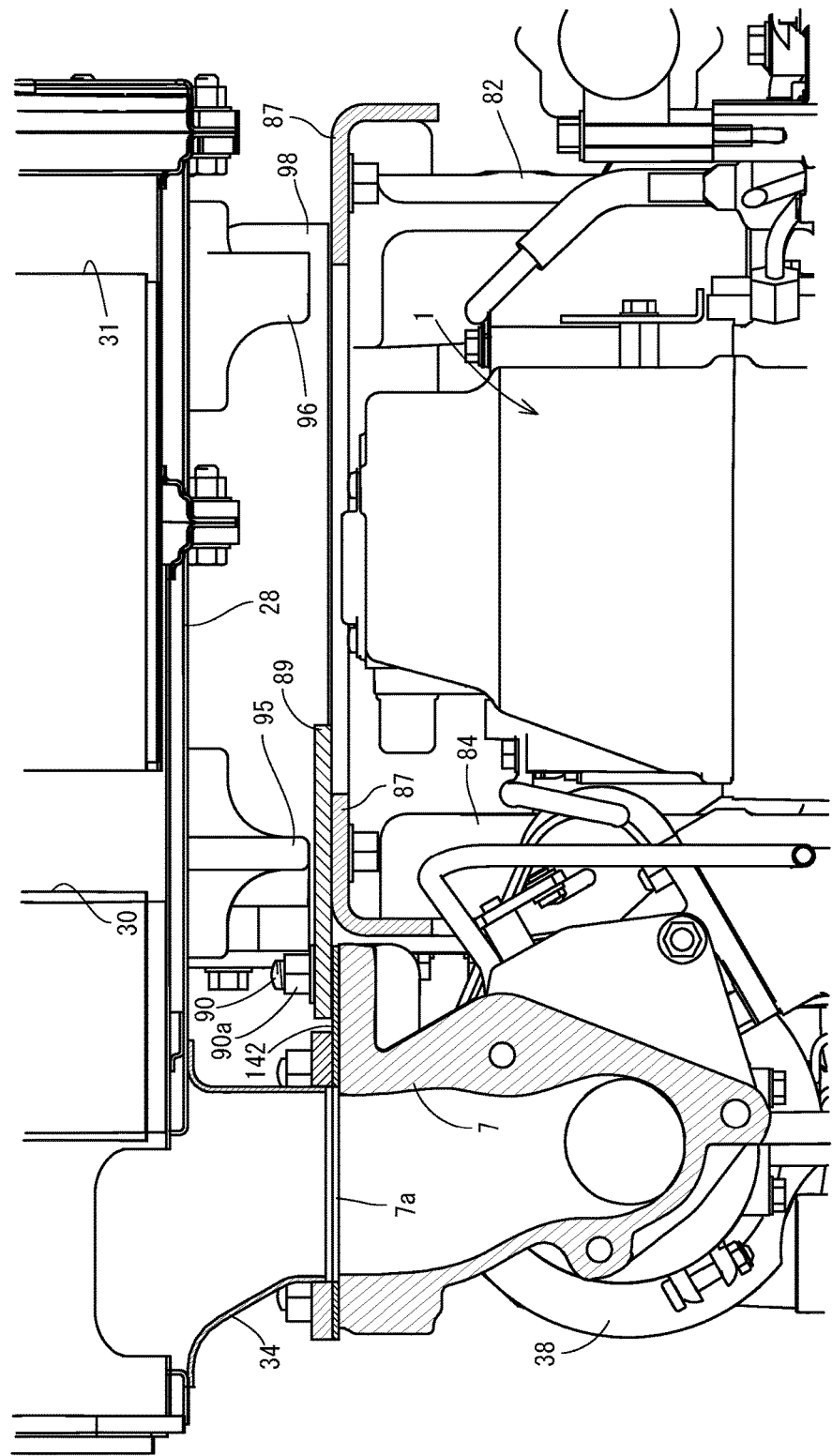
FIG. 25 is a cross sectional explanatory view showing a modified structure of FIG. 24.

Further, FIG. 25 shows a modified example of the connection structure (FIG. 24) between the diesel engine 1 and the exhaust gas purification device 27 (the first case 28). As shown in FIG. 25, a large size gasket 142 is pinched between the exhaust gas outlet surface 7a of the diesel engine 1 and the exhaust gas inlet surface (the inlet flange body 34a) of the first case 28, the DPF inlet pipe 34 (the inlet flange body 34a) is firmly fixed to the exhaust gas outlet pipe 7 via the large size gasket 142, the large size gasket 142 is extended between the exhaust gas outlet surface 7a of the diesel engine 1 and the positioning body 89 brought into surface contact with the exhaust gas outlet pipe 7, and the positioning body 89 is firmly fixed to the exhaust gas outlet surface 7a of the diesel engine 1 via the large size gasket 142.

As shown in FIGS. 1 to 5 and FIG. 25, the large size gasket 142 is pinched between the exhaust gas outlet surface 7a of the diesel engine 1 and the inlet flange body 34a corresponding to the exhaust gas inlet surface of the first case 28, and the large size gasket 142 is extended between the exhaust gas outlet surface 7a of the diesel engine 1 and the surface contact portion of the support base 87. Therefore, the first case 28 can be firmly fixed to the support base 87 by adjusting the support position of the first case 28 so that the exhaust gas inlet surface of the first case 28 is flush with the surface contact portion of the support base 87. It is possible to form the height position of the inlet flange body 34a of the first case 28 and the height position of the attachment surface of the first case 28 in the support base 87 flush without necessity of taking the thickness of the large size gasket 142 into consideration, it is possible to easily determine the relative positions of the support base 87 and the first case 28 (the exhaust gas purification device 27) on the basis of the same plane, and it is possible to improve the assembly workability of the exhaust gas purification device 27.

Next, a description will be given of the exhaust gas purification device 27 (the attachment structure of the first case 28, the second case 29, and the fastening bands 97) with reference to FIGS. 1 to 6, FIG. 11, and FIGS. 26 and 27. As shown in FIGS. 1 to 6, FIG. 11, and FIGS. 26 and 27, four fastening bands 97 are provided as a plurality of pinching bodies. The fastening band 97 has a belt-like fastening band main body 97a, and a fastening bolt 97b which is firmly fixed to both end sides of the fastening band main body 97a. In a state in which the fastening band main body 97a is wound around the first case 28 or the second case 29, a leading end side of the fastening bolt 97b is fitted and inserted to the left case fixing body 95 and the right case fixing body 96, a fastening nut 97c is threadably attached to the leading end side of the fastening bolt 97b, and the first case 28 is firmly fixed to the rear side mounting portions of the left case fixing body 95 and the right case fixing body 96 via two left and right fastening bands 97. Further, the second case 29 is firmly fixed to the front side mounting portions of the left case fixing body 95 and the right case fixing body 96 via two left and right fastening bands 97, and the first case 28 and the second case 29 which are long in the lateral direction and are formed into cylindrical shapes are arranged in parallel in a sideways falling attitude in the upper surface side of the diesel engine 1.

Figure 26:
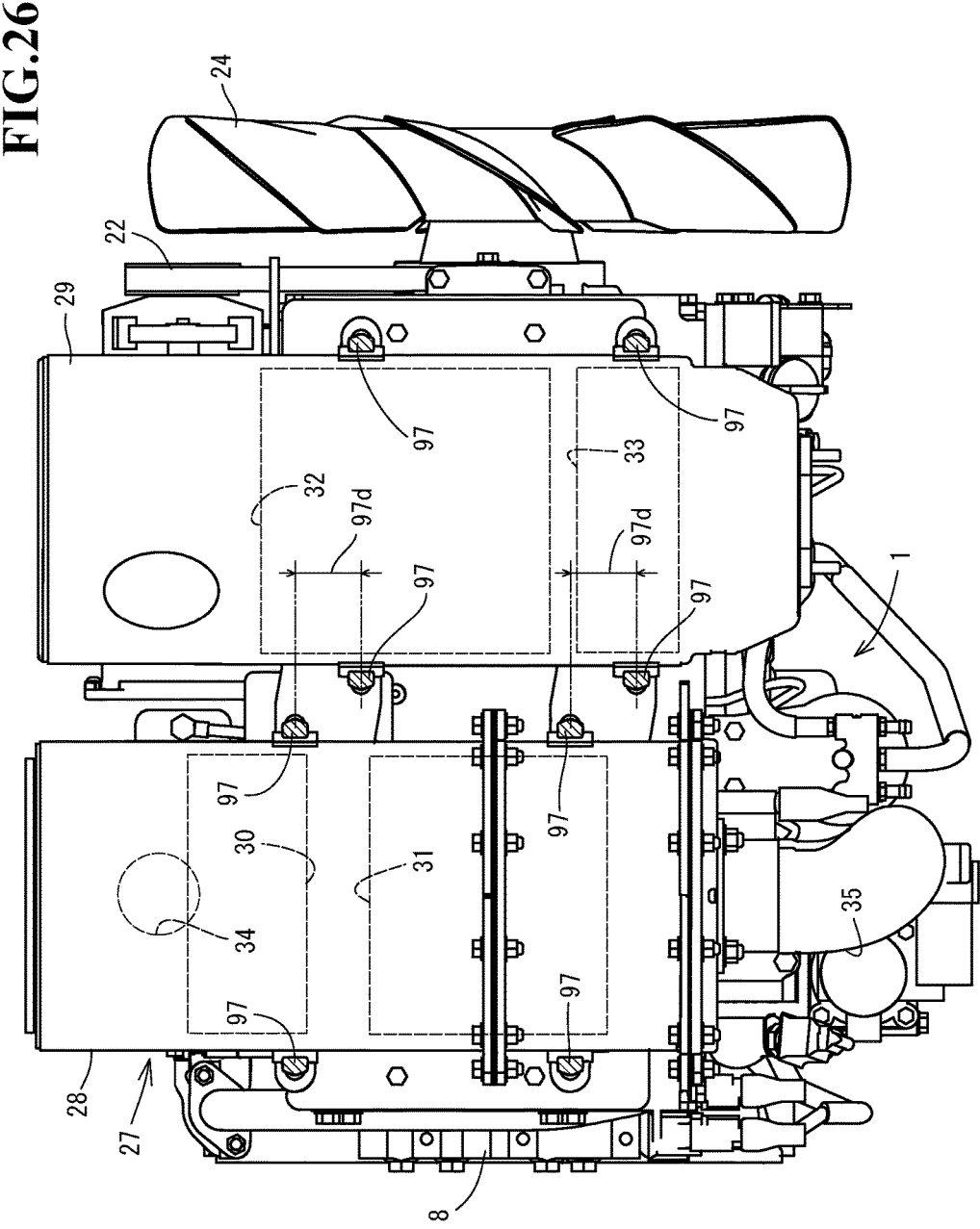
FIG. 26 is a cross sectional plan view of an exhaust gas purification device.

More specifically, the support frame body 98 is firmly fixed to the support base upper surface in the engine upper surface side by connecting the left and right case fixing bodies 95 and 96 via the support frame body 98, as well as firmly and integrally fixing the first case 28 and the second case 29 by four fastening bands 97 and the left and right case fixing bodies 95 and 96. In addition, the first case 28 pinching side fastening band 97 and the second case 29 pinching side fastening band 97 are arranged so as to be offset in the longitudinal direction (the exhaust gas moving direction) of the cases at a displacement interval 97d which is equal to or more than a short side width of the fastening band main body 97a, as shown in FIG. 26. Therefore, it is possible to shorten a case attachment gap 97e between the first case 28 and the second case 29 without interference between the first case 28 pinching side fastening band 97 and the second case 29 pinching side fastening band 97, as shown in FIG. 27.

As shown in FIGS. 1 to 6, FIG. 11, and FIGS. 26 and 27, in the engine device having the first case 28 which removes the particulate matter in the exhaust gas of the diesel engine 1, and the second case 29 which removes the nitrogen oxides in the exhaust gas of the diesel engine 1, and connecting the second case 29 to the first case 28 via the urea mixing pipe 39, the support frame body 98 firmly fixing the first case 28 and the second case 29 is provided, the first case 28 and the second case 29 are firmly and integrally fixed to the support frame body 98 by the fastening bands 97 corresponding to a plurality of pinching bodies, and the fastening band 97 in the first case 28 side and the fastening band 97 in the second case 29 side are offset in the longitudinal direction of the cases 28 and 29. Therefore, it is possible to reduce an installation width of the fastening band 97 according to the offset arrangement without necessity of securement for the installation space of both the fastening band 97 in the first case 28 side and the fastening band 97 in the second case 29 side between the first case 28 and the second case 29. For example, it is possible to easily reduce the attachment interval 97e of the first case 28 and the second case 29 which are long in the exhaust gas moving direction and are formed into cylindrical shapes, and the first case 28 and the second case 29 can be compactly arranged within the width of the case attachment portion of the diesel engine 1 (the longitudinal width of the support base 87). Further, it is possible inhibit the temperature of the exhaust gas in the inner portions of the cases 28 and 29 from being lowered, due to the close contact arrangement of the first case 28 and the second case 29, and it is possible to well maintain the exhaust gas purification action of the case support bases.

As shown in FIGS. 1 to 6 and FIG. 27, a plurality of left and right case fixing bodies 95 and 96 are provided for firmly and integrally fixing the first case 28 or the second case 29 by a plurality of fastening bands 97, the first case 28 and the second case 29 are firmly and integrally fixed by a plurality of fastening bands 97 and the left and right case fixing bodies 95 and 96, the support base 87 firmly fixed to the upper surface side of the diesel engine 1 is provided, and the left and right case fixing bodies 95 and 96 are connected to the upper surface side of the support base 87 via the support frame body 98. Therefore, each of the cases 28 and 29 can be easily assembled in and disassembled from the upper surface side of the diesel engine 1 by attaching and detaching the support frame body 98 and the support base 87, while the first case 28 and the second case 29 are compactly arranged within the width of the upper surface side of the diesel engine 1.

Figure 27:
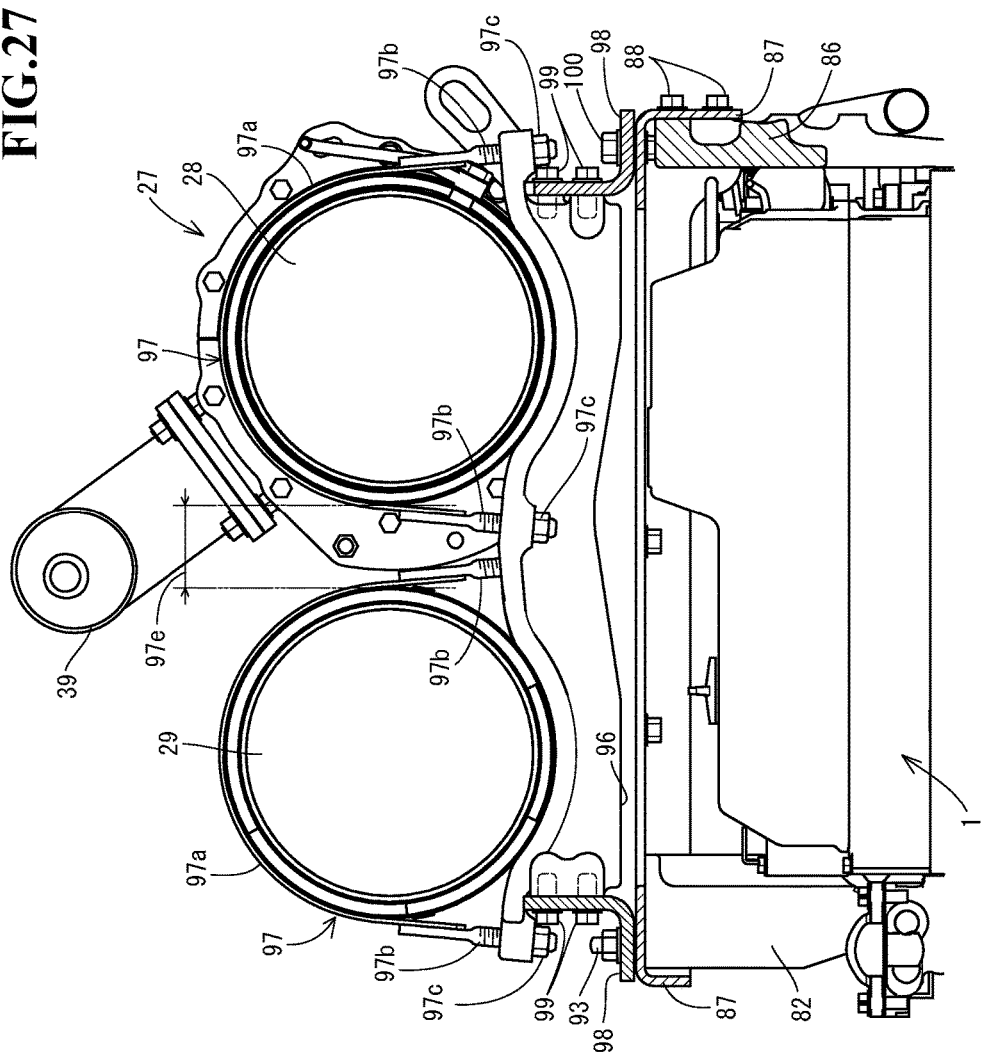
FIG. 27 is a cross sectional side elevational view of the exhaust gas purification device.

As shown in FIG. 27, the exhaust gas purification device 27 serving as the exhaust gas purification unit is constructed by forming the inner diameter of the bolt through hole of the support frame body 98 for fitting and inserting the bolt 99 thereto larger than the outer diameter of the bolt 99 for fastening each of the case fixing bodies 95 and 96 and the support frame body 98, loosely fitting and inserting the leading end side of the bolt 99 to the bolt through hole of the support frame body 98, threadably attaching the leading end side of the bolt 99 to each of the case fixing bodies 95 and 96, fastening by the bolts 99 the front and rear support frame bodies 98 to the front and rear end portions of the left case fixing body 95 and the right case fixing body 96 so as to be adjustable the attachment positions (the support attitudes), and firmly fixing the first case 28 and the second case 29 to the left and right case fixing bodies 95 and 96 and the front and rear support frame bodies 98 which are connected in the quadrangular frame shape via the fastening bands 97.

More specifically, as shown in FIG. 27, the exhaust gas purification device 27 serving as the exhaust gas purification unit is formed by connecting the case fixing bodies 95 and 96 to the support frame bodies 98, and firmly and integrally fixing the cases 28 and 29 to the support frame bodies 98 via the case fixing bodies 95 and 96, and the exhaust gas purification device 27 is adapted to be mounted on and fixed to the support base 87. Therefore, it is possible to simplify the relatively positioning work and the like of the support base 87 and the first case 28 on the basis of the attachment position in the diesel engine 1 side, and the exhaust gas purification device 27 can be easily assembled in and disassembled from the diesel engine 1 according to the attaching and detaching work of the support frame base 87 and the support body 98.

The embodiments of the present invention relates to an engine device such as a diesel engine which is mounted to an agricultural machine (a tractor or a combine harvester) or a construction machine (a bulldozer, a hydraulic excavator, or a loader), and more particularly to an engine device having an exhaust gas purification device which removes a particulate matter (soot or particulate) contained in exhaust gas, nitrogen oxides (NOx) contained in the exhaust gas, or the like thereon.

What is claimed is:

1. An engine device comprising:
a first case configured to remove particulate matters in exhaust gas of an engine;
a second case configured to remove nitrogen oxides in the exhaust gas of the engine;
a urea mixing pipe, the second case connected to the first case via the urea mixing pipe;
a support base;
a support frame body configured to be detachably fastened to the support base, wherein the first case and the second case are integrally fixed by the support frame body, so as to form an exhaust gas purification unit, the exhaust gas purification unit configured to be detachably fastened to the engine,
wherein the exhaust gas purification unit comprises fastening bands and a pair of case fixing bodies, the pair of case fixing bodies and the fastening bands configured to arrange the first and second cases in parallel on the support frame body, the support frame body comprising a pair of front and rear support frame body portions which are connected to respective of the front and rear ends of the pair of case fixing bodies;
suspension members fixed to the case fixing bodies and the support frame bodies, wherein the support base is fastened to an upper surface side of the engine, and the exhaust gas purification unit is configured to be attached to and detached from an upper surface of the support base that is configured to be a horizontal surface; and
a leg attachment portion, wherein the engine, the exhaust gas purification unit and assembly accessories for one set of the engine and the gas purification unit are configured to be mounted on the same packing base, the packing base configured to be loadable to a transport container, wherein the leg attachment portion of the engine device is fixed to the packing base via one or more mounting bed frame bodies.

2. The engine device according to claim 1, wherein:
each fastening band of the fastening bands includes a main body having a width dimension,
the fastening bands include a first fastening band and a second fastening band, and
the fastening bands are configured such that the first fastening band on the first case and the second fastening band on the second case are offset in a longitudinal direction of the first or second cases at a displacement interval which is equal to or more than the width dimension.

3. The engine device according to claim 2, wherein the case fixing bodies are coupled to the upper surface of the support base via the support frame body, the case fixing bodies are coupled to the support frame body so as to be adjustable in their relative positions, the first and second cases are integrally fastened to the support frame body via the case fixing bodies so as to form the exhaust gas purification unit, and the exhaust gas purification unit is fixed on the support base.

4. A packing base configured to be loadable to a transport container and comprising an engine device, the engine device comprising:
an engine comprising:
a support base fastened to an upper surface side of the engine, an upper surface of the support base configured to be a horizontal surface; and
a leg attachment portion; and
an exhaust gas purification unit configured to be attached to and detached from the upper surface of the support base, the exhaust gas purification unit comprising:
a support frame body comprising a pair of front and rear support frame body portions, the support frame body configured to be detachably fastened to the support base;
a first case configured to remove particulate matters in exhaust gas of the engine;

a second case configured to remove nitrogen oxides in the exhaust gas of the engine, the first case and the second case integrally fixed to the support frame;

a urea mixing pipe, the second case connected to the first case via the urea mixing pipe;

a pair of case fixing bodies, the pair of front and rear support frame body portions connected to respective of the front and rear ends of the pair of case fixing bodies;

fastening bands, the pair of case fixing bodies and the fastening bands configured to arrange the first and second cases in parallel on the support frame body; and wherein:

the engine, the exhaust gas purification unit and assembly accessories for one set of the engine and the exhaust gas purification unit are mounted on the packing base, the leg attachment portion is fixed to the packing base via one or more mounting bed frame bodies, and the support frame body of the exhaust gas purification unit is fixed to the packing base.

5. The packing base of claim 4, wherein engine device further comprises suspension members fixed to the case fixing bodies and the support frame bodies.

6. An engine device comprising:

an engine comprising a support base and an exhaust gas outlet surface; and an exhaust gas purification unit configured to be coupled to the engine, the exhaust gas purification unit comprising:

a first case configured to remove particulate matters in exhaust gas of an engine, wherein an exhaust gas inlet surface of the first case is configured to be coupled to the exhaust gas outlet surface;

a second case configured to remove nitrogen oxides in the exhaust gas of the engine;

a urea mixing pipe, the second case connected to the first case via the urea mixing pipe;

a support frame body comprising a pair of front and rear support frame body portions, the support frame configured to be detachably fastened to the support base;

a pair of case fixing bodies, the pair of front and rear support frame body portions connected to respective of the front and rear ends of the pair of case fixing bodies; and fastening bands, the pair of case fixing bodies and the fastening bands configured to arrange the first and second cases in parallel on the support frame body; and suspension members coupled to the case fixing bodies and configured to enable suspension of the exhaust gas purification unit for coupling the exhaust gas purification unit to the support base of the engine, where the suspension members comprise:

a first suspension member coupled to a first case fixing body of the pair of case fixing bodies and extends in a first upward diagonal direction from the first case fixing body and toward the front support frame body portion; and a second suspension member coupled to a second case fixing body of the pair of case fixing bodies and extends in a second upward diagonal direction from the second case fixing body and toward the rear support frame body portion.

7. The engine device of claim 6, wherein:

the support base includes a first fixing bolt body and a second fixing bolt coupled that extend upward from an upper surface of the support base;

the first case fixing body comprises a first through hole configured to receive the first fixing bolt body; and the second case fixing body comprises a second through hole configured to receive the second fixing bolt body.

8. The engine device of claim 7, wherein:

the suspension members are configured to enable suspension of the exhaust gas purification unit via a hoist or a chin block;

the front and rear support frame body portions and the pair of case fixing bodies define a quadrangular frame;

the first suspension member is positioned at a first apex angle position of the quadrangular frame;

the second suspension member is positioned at a second apex angle position of the quadrangular frame that is opposite the first apex angle position;

the first through hole is positioned at a third apex angle position of the quadrangular frame that is an adjacent apex angle position of the first apex angle position and the second apex angle position; and the second through hole is positioned at a fourth apex angle position of the quadrangular frame that is opposite the third apex angle position.

9. The engine device of claim 6, wherein the support base is configured to be brought into direct surface contact with the exhaust gas outlet surface of the engine.

10. The engine device of claim 6, further comprising a gasket that is configured to be pinched between the exhaust gas outlet surface of the engine and the exhaust gas inlet surface of the first case.

11. The engine device of claim 6, wherein the engine and the exhaust gas purification unit are configured to be coupled to the same packing base, the packing base configured to be loadable to a transport container.

12. The engine device of claim 11, wherein each of the engine and the exhaust gas purification unit are configured to be separably coupled to the packing base.

13. The engine device of claim 12, wherein:

a leg attachment portion of the engine is configured to be fixed to a first portion the packing base via one or more mounting bed frame bodies, and the support frame body of the exhaust gas purification unit is configured to be fixed to a second portion of the packing base.

* * * * *